United States Patent
Okada et al.

(10) Patent No.: US 8,102,241 B2
(45) Date of Patent: Jan. 24, 2012

(54) VEHICLE CONTROL SYSTEM

(75) Inventors: Noriaki Okada, Chiryu (JP); Hironori Katoh, Anjo (JP); Hiromichi Naitoh, Okazaki (JP); Munenori Matsumoto, Kariya (JP); Masahiro Sugiura, Takahama (JP); Mitsugi Ootsuka, Kariya (JP); Akihiro Taguchi, Obu (JP)

(73) Assignee: Denso Corporation, Kariya (JP)

( * ) Notice: Subject to any disclaimer, the term of this patent is extended or adjusted under 35 U.S.C. 154(b) by 1194 days.

(21) Appl. No.: 11/840,733

(22) Filed: Aug. 17, 2007

(65) Prior Publication Data

US 2008/0055042 A1    Mar. 6, 2008

(30) Foreign Application Priority Data

Sep. 6, 2006  (JP) ................................. 2006-241581

(51) Int. Cl.
*G08B 21/00* (2006.01)
(52) U.S. Cl. ..................... 340/5.64; 340/5.61; 340/5.72; 455/345; 370/431; 307/10.1
(58) Field of Classification Search .................. 340/447, 340/5.72, 5.61, 5.64; 455/345, 352, 353; 370/431; 307/10.1
See application file for complete search history.

(56) References Cited

U.S. PATENT DOCUMENTS

| | | | |
|---|---|---|---|
| 5,602,524 A | | 2/1997 | Mock et al. |
| 5,937,002 A | * | 8/1999 | Andersson et al. ............ 375/131 |
| 6,127,740 A | * | 10/2000 | Roddy et al. .................. 307/10.1 |
| 6,760,579 B1 | | 7/2004 | Yokoyama et al. |
| 6,801,134 B1 | * | 10/2004 | Juzswik ...................... 340/12.51 |
| 2005/0191966 A1 | | 9/2005 | Katsuta |
| 2006/0255909 A1 | | 11/2006 | Pavatich et al. |
| 2007/0046427 A1 | * | 3/2007 | Ghabra et al. ............... 340/5.61 |

FOREIGN PATENT DOCUMENTS

| | | |
|---|---|---|
| DE | 102 26 294 | 12/2003 |
| DE | 103 04 081 | 5/2004 |
| DE | 10 2004 038 836 | 2/2006 |
| EP | 1 362 753 | 11/2003 |
| GB | 2 311 155 | 9/1997 |
| JP | 04-315681 | 11/1992 |
| JP | 04-345328 | 12/1992 |
| JP | 09-144404 | 6/1997 |

(Continued)

OTHER PUBLICATIONS

German Office Action dated Mar. 24, 2010, issued in corresponding German Application No. 10 2007 039 599.-51, with English translation.

(Continued)

*Primary Examiner* — Jennifer Mehmood
*Assistant Examiner* — Mark Rushing
(74) *Attorney, Agent, or Firm* — Nixon & Vanderhye P.C.

(57) ABSTRACT

When a demodulated signal of a radio signal in Ch1 transmitted from a TPMS transmitter is acquired, a control IC controls the frequency of a signal inputted from a PLL circuit to a mixer into a frequency for converting a TPMS radio signal into an intermediate frequency signal of a specific frequency. When the demodulated signal of the radio signal transmitted from a portable unit through two frequency channels is acquired, the control IC determines a channel whose state of communication is favorable from between Ch2 and Ch3, and controls the signal frequency for conversion into a frequency for converting a keyless radio signal in the determined channel into an intermediate frequency signal.

18 Claims, 13 Drawing Sheets

FOREIGN PATENT DOCUMENTS

| | | |
|---|---|---|
| JP | 2000-022614 | 1/2000 |
| JP | 2002-129794 | 5/2002 |
| JP | 2005-299305 | 10/2005 |
| JP | 2006-213289 | 8/2006 |
| JP | 2006-214240 | 8/2006 |

OTHER PUBLICATIONS

Chinese Office Action dated Aug. 24, 2010, issued in corresponding Chinese Application No. 200710148710.9, with English translation.
Japanese Office Action dated Oct. 5, 2010, issued in corresponding Japanese Application No. 2006-241581, with English translation.

* cited by examiner

VEHICLE CONTROL SYSTEM

CROSS REFERENCE TO RELATED APPLICATION

This application is based on and incorporates herein by reference Japanese Patent Application No. 2006-241581 filed on Sep. 6, 2006.

FIELD OF THE INVENTION

The present invention relates to a vehicle control system including a keyless entry system and a vehicle condition monitoring system.

BACKGROUND OF THE INVENTION

In the field of vehicle control, various electronic control systems, such as a keyless entry system and a vehicle condition monitoring system (for instance, tire condition monitoring system), uses a radio communication technique.

A keyless entry system, which is disclosed in JP 2002-129794A for example, includes an in-vehicle unit mounted in a vehicle and a portable unit carried by a user of the vehicle. In this system, when a user carrying the portable unit gets into a detection area within a predetermined range from the vehicle (in-vehicle unit), the portable unit and the in-vehicle unit automatically perform radio communication with each other. When it is authenticated that the portable unit is an authorized one, a predetermined operation (e.g., locking/unlocking doors, starting/stopping an engine, etc.) is automatically performed.

A tire condition monitoring system such as a tire pressure monitoring system (TPMS), which is disclosed in U.S. Pat. No. 5,602,524 (JP-T-7-507513) for example, includes a tire sensor provided in each tire of the vehicle. The tire sensor periodically detects the air pressure, temperature, or the like of the tire and transmits the result of the detection together with identification information for identifying the tire by radio. The in-vehicle unit mounted in the vehicle body receives the result of the detection and informs the vehicle user of the state of the tire or performs other like operation.

When both the keyless entry system and the TPMS are mounted in the same vehicle, each system is required to use a different frequency band to carry out radio communication to prevent radio interference between the systems. It is thus required to provide different radio communication circuits on a system-by-system basis. However, such different communication circuits on a system-by-system basis incur increase in the size and cost of a system configuration. If a radio signal includes noise, radio communication cannot be normally carried out in each system. Especially, if radio communication is not normally carried out in the keyless entry system, it becomes impossible to automatically lock or unlock doors or start or stop the engine.

SUMMARY OF THE INVENTION

The invention has therefore has an object to suppress increase in size and cost of a vehicle control system including a keyless entry system and a vehicle condition monitoring system and to ensure reliable radio communication in the keyless entry system.

A vehicle control system includes a portable unit, a vehicle condition detector, and an in-vehicle receiver. The portable unit is carried by a user of a vehicle and transmits a radio signal as a first radio signal for a keyless entry system for remotely operating in-vehicle equipment. The portable unit transmits the first radio signal through multiple channels different in frequency. The vehicle condition detector is mounted in the vehicle and transmits a radio signal as a second radio signal for a vehicle condition monitoring system. The in-vehicle receiver is mounted in the vehicle and receives the first radio signal and the second radio signal.

The in-vehicle receiver includes a receiving antenna, a channel determination circuit, a frequency conversion circuit, a demodulation circuit and a control unit. The receiving antenna receives the first radio signal and the second radio signal. The channel determination circuit determines an optimal channel, which is the most favorable one among the multiple channels. The frequency conversion circuit alternatively selects either the first radio signal or the second radio signal on any of the multiple channels from among signals received through the receiving antenna, and converts the signal into an intermediate frequency signal of a specific frequency. The demodulating circuit demodulates the intermediate frequency signal outputted from the frequency conversion circuit. The control unit causes the frequency conversion circuit to select the second radio signal, when it acquires the demodulated signal of the second radio signal from the demodulating circuit. The control unit further causes the frequency conversion circuit to select the first radio signal on the optimal channel determined by the channel determination circuit, when it acquires the demodulated signal of the first radio signal from the demodulating circuit.

In this vehicle control system, the frequency conversion circuit of the in-vehicle receiver alternatively selects either the first radio signal or the second radio signal on any of the multiple channels, and converts it into the intermediate frequency signal. Therefore, whichever of the first radio signal or the second radio signal is received, it can be ensured that the radio signal received is converted into the intermediate frequency signal of the specific frequency and outputted from the frequency conversion circuit to the demodulating circuit. For this reason, it is unnecessary to separately provide a frequency conversion circuit for the first radio signal and for the second radio signal. Only frequency conversion circuit can be used for both signals. The receiving antenna and the demodulating circuit are also used for both signals. Therefore, it is possible to suppress increase in size and cost of the in-vehicle receiver and eventually the system configuration.

When the control unit acquires the demodulated signal of the first radio signal, it causes the frequency conversion circuit to select the first radio signal on the optimal channel determined by the channel determination circuit. This optimal channel is a channel whose state of communication is most favorable, in other words, a channel on which the distortion of the first radio signals is reduced most. Thus, an error is less prone to be produced in the demodulated signals of the first radio signal on the optimal channel. For this reason, data transmitted from the portable unit can be correctly received at the in-vehicle receiver. As a result, it is possible to ensure that communication is more reliably carried out between the portable unit and the in-vehicle receiver.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
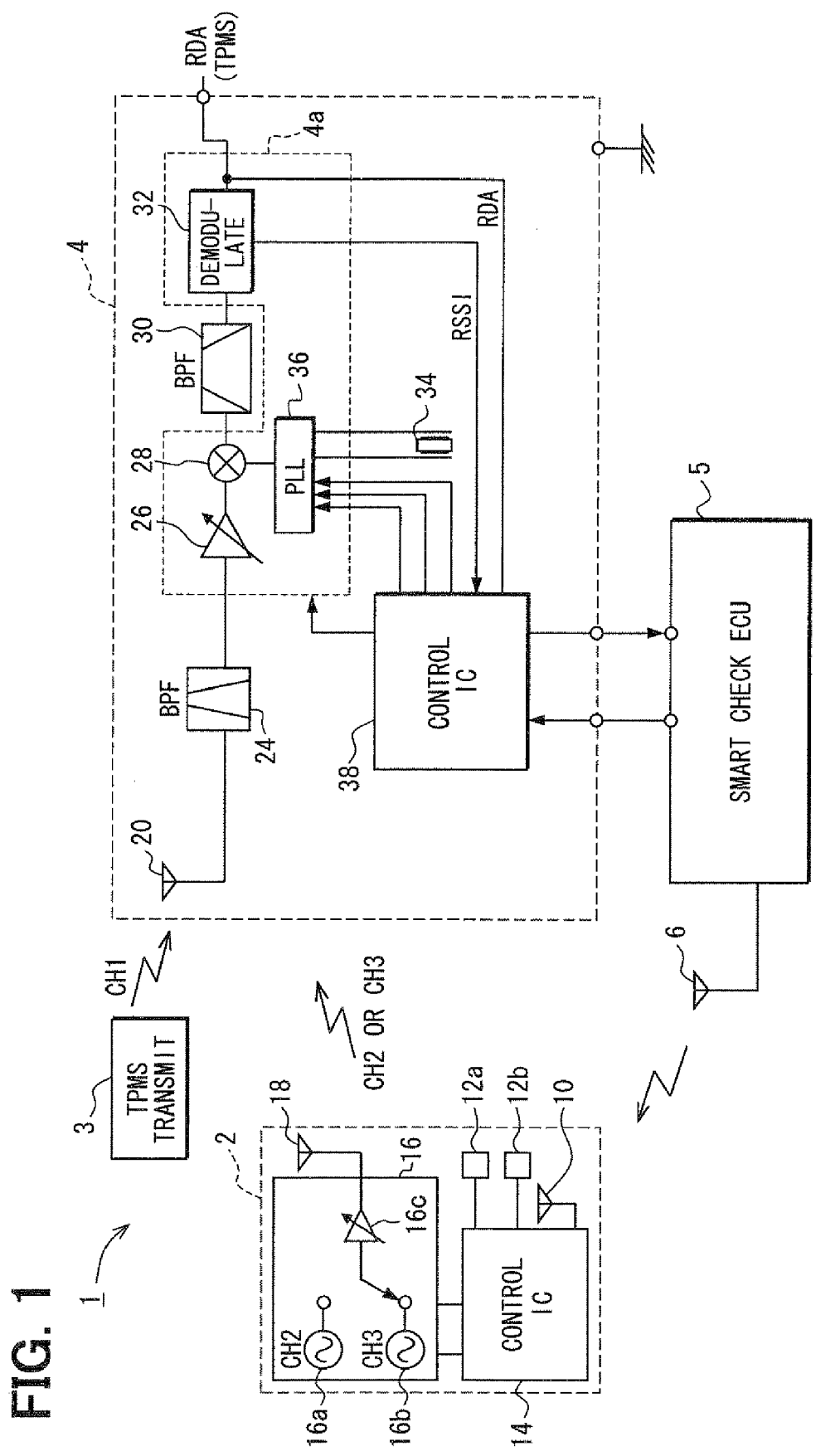
FIG. 1 is a block diagram of a vehicle control system according to a first embodiment of the present invention.

Referring first to FIG. 1, a vehicle control system 1 is a combination of a remote keyless entry (RKE) system, a smart entry system, and a tire pressure monitoring system (TPMS) as a vehicle condition monitoring system. It includes a smart portable unit 2 carried by a user of a vehicle, a TPMS transmitter 3 fitted to each wheel of the vehicle; an integrated tuner 4 mounted in the vehicle; a smart check ECU 5; and an antenna 6.

The remote keyless entry system makes it possible for the user to lock or unlock the doors at a location away from the vehicle by operating a push-button lock switch 12a or a push-button unlock switch 12b on the smart portable unit 2. The smart entry system implements the following, for example: when the user of the vehicle carrying the smart portable unit 2 approaches the vehicle and touches a door handle, the doors are unlocked. The TPMS is so constructed that it detects the air pressure in each tire of the vehicle and, if any abnormality occurs in air pressure, informs the user of it.

The TPMS transmitters 3 detect the tire pressures of the corresponding tires. Then, each of the TPMS transmitters 3 periodically transmits a TPMS radio signal with such timing that signals do not overlap. The TPMS radio signal contains tire pressure data on the result of detection and wheel identifying information indicating to which tire wheel the data pertains. The frequency band of the TPMS radio signal will be designated as channel (Ch) 1.

The smart portable unit 2 includes: an integrated circuit (IC) 14 that controls the function of the smart portable unit 2; an antenna 18 for transmitting radio signals to the integrated tuner 4; a transmission module 16 that supplies radio signals to the antenna 18; the push-button lock switch 12a to be pressed to instruct locking of the doors of the vehicle; the push-button unlock switch 12b to be pressed to instruct unlocking of the doors of the vehicle; and an antenna 10 for receiving signals transmitted from the antenna 6 mounted on the vehicle.

The transmission module 16 includes: carrier generation circuits 16a, 16b that generate and output sine waves with respective predetermined carrier frequencies that become carrier waves (carriers) for radio signals; and an amplifier (AMP) 16c. The carrier generation circuits 16a, 16b generate sine waves different in frequency from each other. The transmission module 16 modulates carrier waves generated at the carrier generation circuits 16a, 16b with digital signals outputted from the control IC 14 (e.g., by amplitude or by frequency). Further, it inputs the modulated signals to the AMP 16c to amplify them, and supplies them to an antenna 18. Thus, the modulated signals are transmitted as radio signals from the antenna 18.

The transmission module 16 is so constructed that, based on a command from the control IC 14, it switches the carrier wave modulated with a digital signal outputted from the control IC 14 as follows: it switches the carrier wave between a carrier wave generated by the carrier generation circuit 16a and a carrier wave generated by the carrier generation circuit 16b. The frequency band of the carrier wave generated by the carrier generation circuit 16a will be designated as Ch2; and the frequency band of the carrier wave generated by the carrier generation circuit 16b will be designated as Ch3. Ch2 and Ch3 are both different in frequency band from the above Ch1. In this embodiment, for example, Ch1 is of 314.98 MHz; Ch2 is of 312.15 MHz; and Ch3 is of 314.35 MHz.

The integrated tuner 4 includes: an antenna 20 for receiving TPMS radio signals, radio signals (first transmission radio waves) in Ch2, and radio signals (second transmission radio waves) in Ch3; a band-pass filter (BPF) 24 for letting through the TPMS radio signals, first transmission radio waves, second transmission radio waves received at the antenna 20 and removing other unwanted signals; an amplifier circuit (AMP) 26 that amplifies signals passing through the BPF 24; a mixer 28 that mixes a signal with a local frequency inputted from a PLL circuit 36 into a received signal from the AMP 26, and thereby converts the received signal into an intermediate frequency signal of a specific frequency; an oscillator 34 that generates a reference signal with a certain frequency; the PLL circuit 36 that divides or multiplies the frequency of the reference signal outputted from the oscillator 34 based on a signal inputted from the control IC 38 that controls the functions of the integrated tuner 4, and thereby generates a signal with a desired local frequency and inputs it to the mixer 28; a band-pass filter (BPF) 30 that selectively passes through an intermediate frequency signal of a specific frequency generated by the mixer 28; and a demodulating circuit 32 that demodulates an intermediate frequency signal of a specific frequency passed through the BPF 30. The AMP 26, mixer 28, demodulating circuit 32, and PLL circuit 36 construct a receiver IC 4a. That is, the receiver IC 4a is one package. This is the same with a receiver IC 4b described later.

The control IC 38 detects a demodulated signal (RDA) of the first transmission radio wave and the demodulated signal of the second transmission radio wave from the receiver IC 4a. The control IC 38 also detects the signal intensity (voltage level) of the detected demodulated signals from the demodulated signals. When the first transmission radio wave, second transmission radio wave, or second radio signal is not received by the antenna 20, a demodulated signal is not outputted from the demodulating circuit 32. In this case, a noise level is detected. An electronic control unit (ECU) for TPMS, not shown, in a subsequent stage detects the demodulated signal of a TPMS radio signal.

The remote keyless entry system, smart entry system, and TPMS operate as follows.

When it is detected that the user touches, for example, a door handle with the ignition switch (not shown) of the vehicle being in the OFF state and not in the ON state, the smart check ECU 5 transmits a request signal from the antenna 6 mounted on the vehicle to the smart portable unit 2. When the smart portable unit 2 receives this request signal through the antenna 10, it performs the following operation: the smart portable unit 2 transmits the radio signals, obtained by modulating the carrier waves in Ch2 and Ch3 modulated with the digital signal containing a code for the smart entry system (smart code), through the antenna 18. The smart code is a code unique to the vehicle for which the smart portable unit 2 is used.

When the ignition switch is in the OFF state, Ch2 or Ch3 is set as the reception channel in the integrated tuner 4. The radio signal in Ch2 or Ch3 transmitted from the smart portable unit 2 is demodulated. The smart check ECU 5(or the control IC 38) checks the smart code contained in the demodulated signal with the code unique to the vehicle. When it determines that both codes agree with each other, it carries out processing to unlock the doors of the vehicle.

With the ignition switch being turned on to the ON state, Ch1 is set as the reception channel of the integrated tuner 4, as described later, and the TPMS functions. When it is detected that the user touches, for example, a door handle, the above smart entry system overrides the TPMS and functions.

In the remote keyless entry system, when the lock switch 12a of the smart portable unit 2 is pressed by the user with the ignition switch of the vehicle off, the smart portable unit 2 performs the following operation: it transmits the radio signal obtained by modulating the carrier wave in Ch2 or Ch3 with the digital signal containing a lock command code for commanding that the doors should be locked through the antenna 18. When the unlock switch 12b of the smart portable unit 2 is pressed by the user, the smart portable unit 2 performs the following operation: it transmits the radio signal obtained by modulating the carrier wave in Ch2 or Ch3 with the digital signal containing an unlock command code for commanding that the doors should be unlocked through the antenna 18. The lock command code and the unlock command code are codes unique to the vehicle for which the smart portable unit 2 is used.

Similarly with the case of the smart entry system, Ch2 or Ch3 is set as the reception channel in the integrated tuner 4, and the radio signal in Ch2 or Ch3 transmitted from the smart portable unit 2 is demodulated. The smart check ECU 5 (or the control IC 38) checks the lock code or the unlock code contained in the demodulated signal with the code unique to the vehicle. When both the codes agree with each other, it carries out processing to lock or unlock the doors of the vehicle.

In this embodiment, the smart code, lock code, and unlock code are converted into digital signals by a predetermined coding method (e.g., Manchester coding), and the carrier waves in Ch2 or Ch3 are modulated with these digital signals. In Manchester coding, bit 1 is converted into a signal that falls in the center of one bit period, and bit 0 is converted into a signal that rises in the center of one bit period.

The TPMS radio signal is periodically transmitted from each of the TPMS transmitters 3. When the ignition switch of the vehicle being in the ON state, Ch1 is set as the reception channel of the integrated tuner 4. In the integrated tuner 4, the TPMS radio signal transmitted from the TPMS transmitter 3 is demodulated.

The TPMS radio signal is received by the antenna 20 of the integrated tuner 4 and passes through the BPF 24. Thereafter, it is amplified at the AMP 26 and inputted to the mixer 28. The control IC 38 controls output signals to the PLL circuit 36 so that a signal with a local frequency for TPMS radio signals (304.28 MHz in this example) is outputted from the PLL circuit 36 to the mixer 28. This signal of 304.28 MHz is outputted from the PLL circuit 36 to the mixer 28.

The mixer 28 mixes the signal with the local frequency (304.28 MHz) from the PLL circuit 36 into the received signal (314.98 MHz) from the AMP 26. It thereby converts the received signal into an intermediate frequency signal in the 10.7 MHz band (i.e., 314.98−304.28=10.7).

The intermediate frequency signal outputted from the mixer 28 passes through the BPF 30 that lets through only signals in the 10.7 MHz band, or signals corresponding to a desired wave. Then the signal is inputted to the demodulating circuit 32 and demodulated by the demodulating circuit 32.

Figure 2:
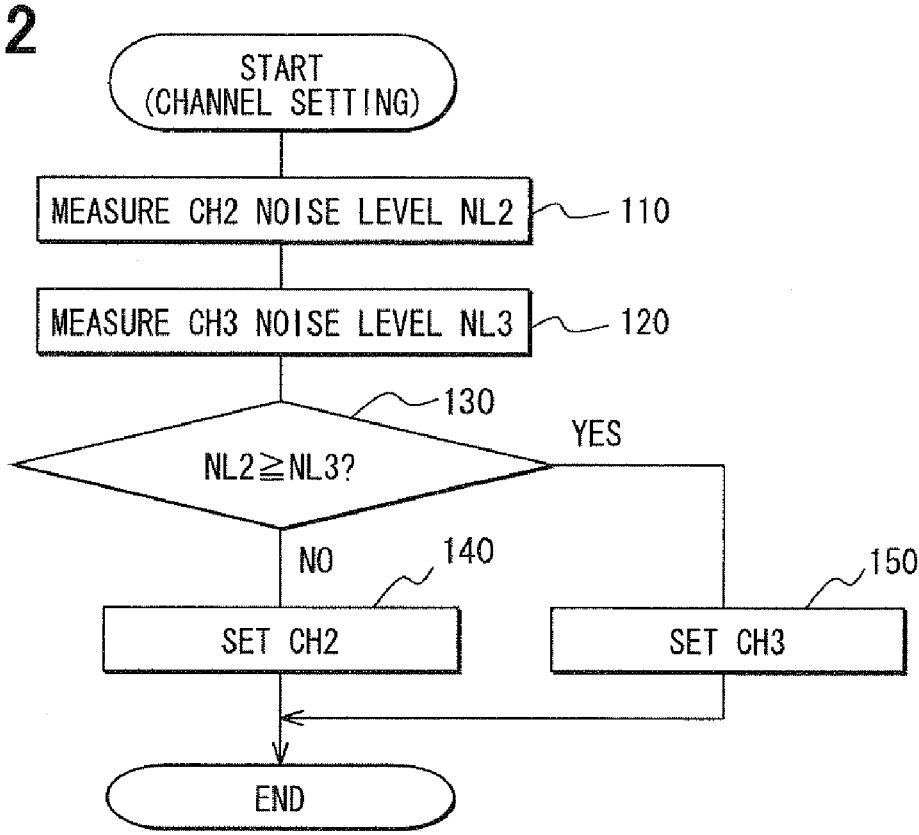
FIG. 2 is a flowchart illustrating reception channel setting processing (noise level measurement) carried out by a control IC.

The remote keyless entry system and the smart entry system operate as follows by executing a flowchart of FIG. 2 illustrating reception channel setting processing. This processing is carried out by the control IC 38 in the remote keyless entry system and the smart entry system. This processing is for setting either Ch2 or Ch3 as the reception channel, and is periodically carried out, for example, when the ignition switch of the vehicle is in the OFF state.

In the reception channel setting processing in FIG. 2, first, the noise level NL2 of Ch2 is measured at step 110. Specifically the noise level NL2 is measured based on the voltage level of a signal detected from the receiver IC 4a, more specifically, the demodulating circuit 32 in a no radio wave state in which the integrated tuner 4 is not receiving the first transmission radio wave.

The control IC 38 then executes step 120 to measure the noise level NL3 of Ch3. At step 130, the noise level NL2 of Ch2 and the noise level NL3 of Ch3 are compared with each other to determine whether or not the noise level of Ch2 is equal to or higher than the noise level of Ch3. When it is determined that the noise level of Ch2 is not equal to or higher than the noise level of Ch3, that is, the noise level of Ch2 is lower than the noise level of Ch3, the control IC 38 executes step 140. At this step, the control IC 38 sets Ch2 as the reception channel. When it is determined at step 130 that the noise level of Ch2 is equal to or higher than the noise level of Ch3, the control IC 38 executes step 150 and sets Ch3 as the reception channel.

When the control IC 38 sets Ch2 as the reception channel at step 140, it controls an input signal to the PLL circuit 36 so that a signal with a local frequency of 301.45 MHz is generated by the PLL circuit 36. That is, the control IC 38 ensures that the following is implemented: the first transmission radio wave (312.15 MHz) in Ch2 is mixed with this signal with the local frequency of 301.45 MHz by the mixer 28, and it is converted into an intermediate frequency signal in the 10.7 MHz band. When the second transmission radio wave (314.35 MHz) in Ch3 is received at this time, the second transmission radio wave is mixed with the signal with the local frequency of 301.45 MHz by the mixer 28, and is converted into the signal of 12.9 MHz. Only the intermediate frequency signal of 10.17 MHz produced by converting the first transmission radio wave is passed through the BPF 30 and inputted to the demodulating circuit 32. The signal of 12.9 MHz produced by converting the second transmission radio wave is removed by the BPF 30.

In addition, a command to transmit a signal indicating Ch2 set as the reception channel is outputted to the smart check ECU 5. According to this transmission command, the smart check ECU 5 transmits a signal indicating Ch2 from the antenna 6 to the smart portable unit 2. This processing operates as channel notifying means. In this case, the smart portable unit 2 transmits a radio signal in the notified channel.

When Ch3 is set as the reception channel at step 150, the control IC 38 controls an input signal to the PLL circuit 36 so that a signal with a local frequency of 303.65 MHz is generated by the PLL circuit 36. That is, the control IC 38 ensures that the following is implemented: the second transmission radio wave (312.15 MHz) in Ch3 is mixed with this signal with the local frequency of 303.65 MHz by the mixer 28, and it is converted into an intermediate frequency signal in the 10.7 MHz band. When the first transmission radio wave (312.15 MHz) in Ch2 is received at this time, the first transmission radio wave is mixed with the signal with the local frequency of 303.65 MHz by the mixer 28, and is converted into a signal of 8.5 MHz. Only the intermediate frequency signal of 10.7 MHz produced by converting the second transmission radio wave is passed through the BPF 30 and inputted to the demodulating circuit 32. The signal of 8.5 MHz produced by converting the first transmission radio wave is removed by the BPF 30.

The reception channel is thus set in advance, and a radio signal transmitted through Ch2 or Ch3, whichever is lower in noise level, is demodulated. Thus, the probability that an error will be produced in a demodulated signal is reduced.

When the TPMS radio signal is transmitted from the TPMS transmitter 3 while the first transmission radio wave is being received (the reception channel is Ch2), the following measure is taken: the functions of the remote keyless entry system or the smart entry system take priority; and the TPMS radio signal (314.98 MHz) is converted into a signal of 13.53 MHz (i.e., 314.98−301.45=13.53) by the mixer 28 and thus removed by the BPF 30. This is the same with cases where the TPMS radio signal is transmitted from the TPMS transmitter 3 while the second transmission radio wave is being received (the reception channel is Ch3). This TPMS radio signal (314.98 MHz) is converted into a signal of 11.33 MHz (i.e., 314.98−303.65=11.33) by the mixer 28 and thus removed by the BPF 30.

Figure 3:
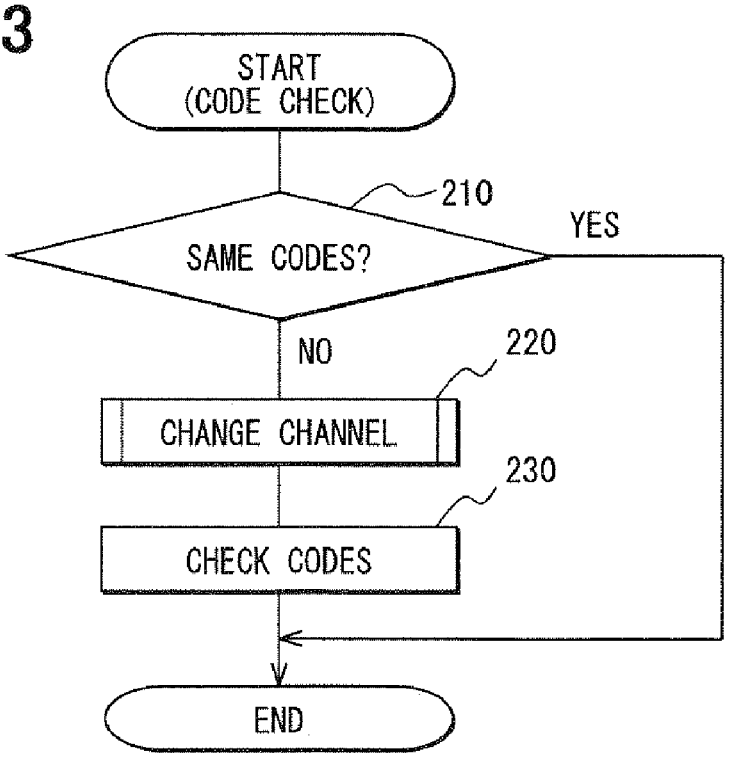
FIG. 3 is a flowchart illustrating first processing carried out by the control IC in communication of a remote keyless entry system.

The control IC 38 also executes the processing shown in FIG. 3 in communication of the remote keyless entry system.

In the processing in FIG. 3, first, the lock code or unlock code contained in a demodulated signal is checked with the code unique to the vehicle at step 210, and it is determined whether or not they agree with each other, that is, whether the codes are the same. When it is determined that both codes agree with each other, a signal indicating that is inputted to the smart check ECU 5, and the processing in FIG. 3 is terminated. Based on the inputted signal, the smart check ECU 5 locks the doors of the vehicle when the code unique to the vehicle agrees with the lock code, and unlocks them when the code unique to the vehicle agrees with the unlock code.

When it is determined at step 210 that the lock code or unlock code contained in the demodulated signal disagrees with the code unique to the vehicle, the control IC 38 executes step 220 and carries out processing to change the reception channel. Specifically, it carries out the reception channel changing processing illustrated in FIG. 4.

Figure 4:
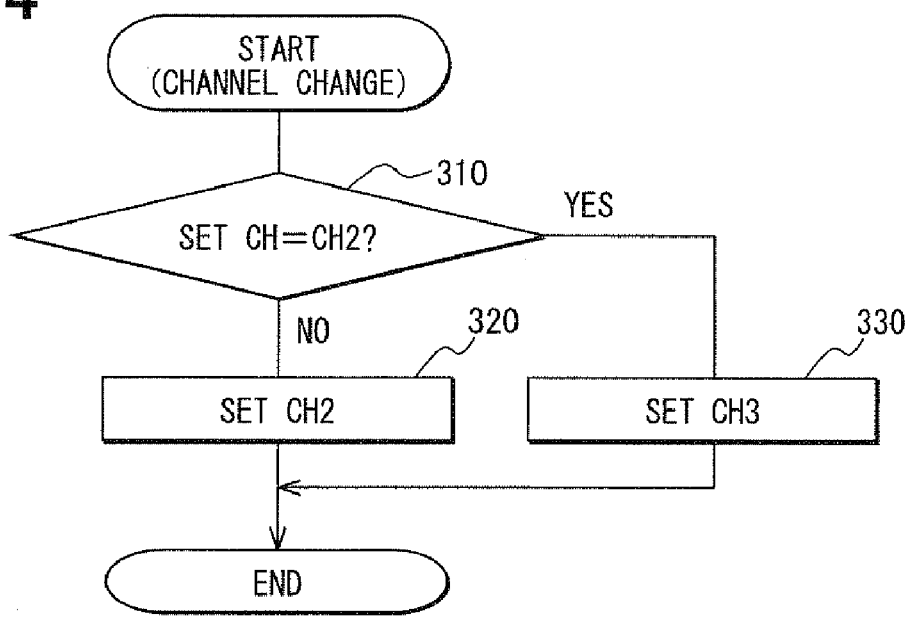
FIG. 4 is a flowchart illustrating reception channel changing processing carried out by the control IC.

In the reception channel changing processing in FIG. 4, first, it is determined at step 310 whether or not the channel set as the reception channel is Ch2. When it is determined that the channel set as the reception channel is not Ch2, the control IC 38 determines that the channel set as the reception channel is Ch3 and executes step 320. Then, it sets Ch2 as the reception channel. Thereafter, the processing in FIG. 4 is terminated.

When it is determined at step 310 that the channel set as the reception channel is Ch2, the control IC 38 executes step 330 and sets Ch3 as the reception channel by changing from Ch 2 to Ch3. Thereafter, the processing in FIG. 4 is terminated.

After carrying out this reception channel changing processing at step 220, the control IC 38 executes step 230. At step 230, it checks the code contained in the demodulated signal of the radio signal transmitted through the channel set as a result of the reception channel changing processing of step 220 with the code unique to the vehicle, Thereafter, the processing in FIG. 3 is terminated. When as a result of check, the codes agree with each other, a signal indicating that is inputted to the smart check ECU 5 and a predetermined vehicle control is carried out. When the codes disagree with each other, a communication error results.

Figure 5:
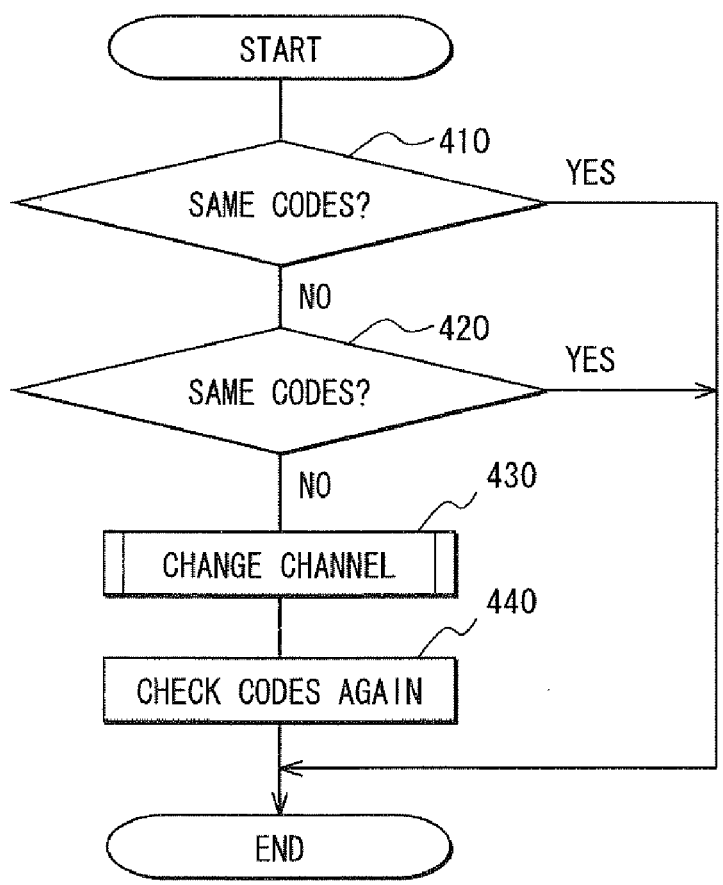
FIG. 5 is a flowchart illustrating first processing carried out by the control IC to execute communication of a smart entry system.

The control IC 38 further executes the processing of FIG. 5 in communication of the smart entry system.

In the processing in FIG. 5, first, the smart code contained in a demodulated signal is checked with the code unique to the vehicle to determine whether or not they agree with each other at step 410. When it is determined that they agree with each other, a signal indicating the code agreement is inputted to the smart check ECU 5, and the processing in FIG. 5 is terminated. Based on the inputted signal, the smart check ECU 5 determines that the smart code agrees with the code unique to the vehicle and unlocks the doors.

When it is determined at step 410 that the smart code contained in the demodulated signal disagrees with the code unique to the vehicle, the control IC 38 executes step 420 and carries out the same processing as that of step 410. When as a result of check, it is determined that the codes agree with each other, a signal indicating that is inputted to the smart check ECU 5, and this processing is terminated.

When it is determined at step 420 that the smart code contained in the demodulated signal disagrees with the code unique to the vehicle, the control IC 38 executes step 430 and carries out processing to change the reception channel. Specifically, it carries out the above reception channel changing processing illustrated in FIG. 4.

The control IC 38 then checks at step 440 the smart code contained in the demodulated signal of a radio signal transmitted through the channel set as a result of the reception channel changing processing of step 430 with the code unique to the vehicle. Thereafter, the processing in FIG. 5 is terminated. When, as a result of check, the smart code agrees with the code unique to the vehicle, a signal indicating that is inputted to the smart check ECU 5 and the doors are unlocked. When the codes disagree with each other, a communication error results.

In the vehicle control system 1 in this embodiment, as described above, the control IC 38 operates as follows on a case-by-case basis. When the demodulated signal of the TPMS radio signal transmitted from the TPMS transmitter 3 is acquired, the control IC 38 performs the following operation: it controls the frequency of the signal inputted from the PLL circuit 36 to the mixer 28 into a frequency for converting the TPMS radio signal into an intermediate frequency signal.

When the demodulated signal of the first transmission radio wave (Ch2) or the second transmission radio wave (Ch3) transmitted from the portable unit 2 is acquired, the control IC 38 performs the following operation: it carries out the processing in FIG. 2 to determine the channel whose noise level is lower (the channel whose state of communication is favorable) from among Ch2 and Ch3; when the noise level of Ch2 is lower, it controls the frequency of the signal inputted from the PLL circuit 36 to the mixer 28 into the frequency for converting the first transmission radio wave into the intermediate frequency signal; and when the noise level of Ch3 is lower, it controls the frequency of the signal inputted from the PLL circuit 36 to the mixer 28 into the frequency for converting the second transmission radio wave into the intermediate frequency signal.

For this reason, the circuit and the like (the antenna 20, receiver IC 4a, etc.) can be used both to receive TPMS radio signals and to receive radio signals transmitted from the smart portable unit 2. Therefore, it is possible to suppress increase in the size and cost of the configuration of the integrated tuner 4 and eventually the entire system.

When the demodulated signal of the radio signal transmitted from the smart portable unit 2 is acquired, the demodulated signal of the radio signal in the channel whose noise level is lower is acquired. Therefore, the probability that data (smart code, lock code, or unlock code) transmitted from the portable unit can be correctly received is enhanced. Consequently, communication can be more reliably carried out.

In this embodiment, the remote keyless entry system and the smart entry system are used as a keyless entry system; the processing of step 110 to 130 in FIG. 2 is a channel determining means and especially, the processing of step 120 and S130 is a noise level detecting means; the mixer 28, PLL circuit 36 and control IC 38 forms a frequency conversion means; and the processing of step 220 and the processing of step 430 are optimal channel changing means.

The embodiment may be so constructed that the processing in FIG. 2 to FIG. 5 may be carried out through cooperation between the control IC 38 and the smart check ECU 5. For example, the embodiment may be so constructed that the processing of steps 110 to 130 in FIG. 2 is carried out by the smart check ECU 5. In this case, a signal detected from the receiver IC 4a by the control IC 38 in a no radio wave state is inputted to the smart check ECU 5. Based on the inputted signal, the smart check ECU 5 measures the noise levels of Ch2 and Ch3 (steps 110, 120) and further compares the noise levels with each other (step 130). Then, it inputs the result of this comparison (YES or NO at step 130) to the control IC 38. Based on the inputted comparison result, the control IC 38 carries out the processing of step 140 or 150.

With respect to the processing in FIG. 3 to FIG. 5, the embodiment may be so constructed that the checking processing (210, 230, 410, 420, 440) is carried out by the smart check ECU 5.

In this case, the embodiment may be so constructed that the control IC 38 inputs the demodulated signal to the smart check ECU 5. Based on the inputted demodulated signal, the smart check ECU 5 checks codes with each other to determine whether or not they agree with each other (steps 210, 410, 420), and inputs the result of this determination to the control IC 38. According to the inputted determination result, the control IC 38 performs the following operation: when the codes disagree with each other, it carries out processing to change the reception channel (steps 220, 430 of FIG. 4), and inputs the demodulated signal produced after the reception channel is changed to the smart check ECU 5. Based on the inputted demodulated signal, the smart check ECU 5 checks the codes with each other (steps 230, S440).

(First Modification)

As a first modification, the following operation may be performed: the first transmission radio wave in Ch2 and the second transmission radio wave in Ch3 are received; and the signal intensity of each signal is measured and the channel in which the signal intensity is higher is set as the reception channel.

In the first modification, first, the following operation is performed in the remote keyless entry system and the smart entry system: a query signal is periodically transmitted from the antenna 6 to the smart portable unit 2 through processing, not shown, carried out by the smart check ECU 5. An acknowledgement signal is transmitted through Ch2 and Ch3 from the smart portable unit 2 that received this query signal, and this acknowledgement signal is received as a response signal at the integrated tuner 4. The control IC 38 carries out the processing in FIG. 6 in place of the processing in FIG. 2 in time with the transmission of the query signal.

Figure 6:
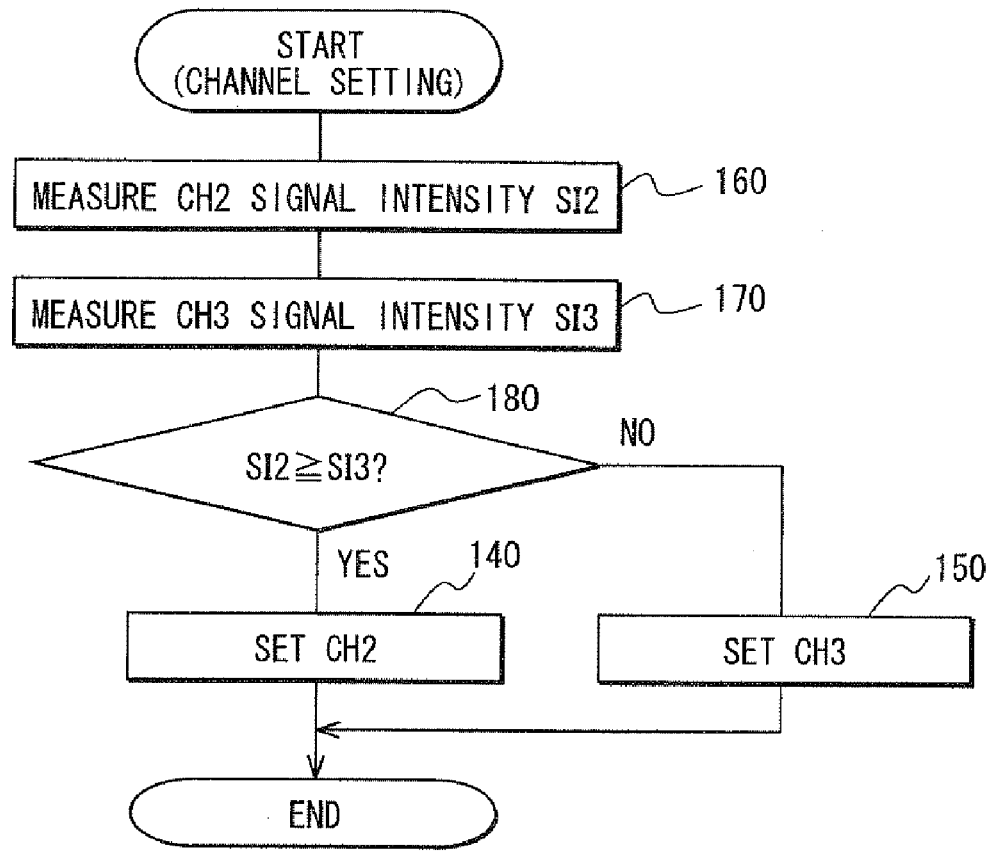
FIG. 6 is a flowchart illustrating reception channel setting processing (RSSI level measurement) carried out by the control IC.

In the processing in FIG. 6, first, the signal intensity SI2 of the first transmission radio wave in Ch2 is measured at step 160. Specifically, the voltage level of the demodulated signal of the first transmission radio wave received by the antenna 20 is measured. Similarly, the signal intensity 513 of the second transmission radio wave in Ch3 is measured at step 170.

The control IC 38 executes step 180 and determines whether or not the signal intensity SI2 of the first transmission radio wave is equal to or higher than the signal intensity SI3 of the second transmission radio wave. When it is determined that the signal intensity of the first transmission radio wave is equal to or higher than the signal intensity of the second transmission radio wave, the control IC 38 executes step 140 and sets Ch2 as the reception channel. When it is determined that the signal intensity in Ch2 is not equal to or higher than the signal intensity in Ch3, that is, the signal intensity in Ch3 is higher than the signal intensity in Ch2, the control IC 38 executes step 150 and sets Ch3 as the reception channel.

The first modification is so constructed that in the processing of steps 140 and 150, the control IC 38 causes the smart check ECU 5 to transmit a signal commanding that the signal intensity should be changed to the smart portable unit 2 through the antenna 6. For example, when the signal intensity is low, a signal commanding that the signal intensity should be increased is transmitted to the smart portable unit 2. When the state of communication is favorable and the signal intensity may be reduced or when it is desired to suppress noise components, a signal commanding that the signal intensity should be reduced is transmitted. This processing is a change command notifying means. This signal may be superimposed on the query signal or the request signal in the smart entry system when it is transmitted.

When the signal commanding that the signal intensity should be changed is received by the antenna 10, the control IC 14 in the smart portable unit 2 controls the amplification level in the transmission module to change the signal intensity based on the signal. The control IC 38 controls the gain (amplification level) of the receiver IC 4a as well as signal intensity change.

Also, in the first modification, the channel whose state of communication is more favorable is determined from among Ch2 and Ch3 through the measurement of the signal intensity. Then, the demodulated signal in the determined channel is acquired. For this reason, it can be ensured that communication is more reliably carried out. Controlling the signal intensity of the radio signal transmitted from the smart portable unit 2 and the gain of the receiver IC 4a makes it possible to accurately transmit and receive data.

The processing of steps 160 to 180 in FIG. 6 in the first modification is channel determining means, and especially, the processing of steps 160 and 170 is signal intensity detecting means.

This first modification may be so constructed that the processing of steps 160 to 180 in FIG. 6 is carried out by the smart check ECU 5. In this case, the control IC 38 inputs a signal (signal indicating the voltage level of the demodulated signal) inputted from the receiver IC 4a to the smart check ECU 5. Based on the inputted signal, the smart check ECU 5 measures the signal intensities in Ch2 and Ch3 (steps 160, 170) and compares the signal intensities with each other (step 180). Then, it inputs the result of this comparison (YES or NO at step 180) to the control IC 38. Based on the inputted comparison result, the control IC 38 carries out the processing of step 140 or 150.

This modification may be so constructed that the processing (steps 140 and 150) for signal intensity change is carried out by the smart check ECU 5. Further, the processing for controlling the gain of the receiver IC 4a may be carried out by the smart check ECU 5.

(Second Modification)

Figure 7:
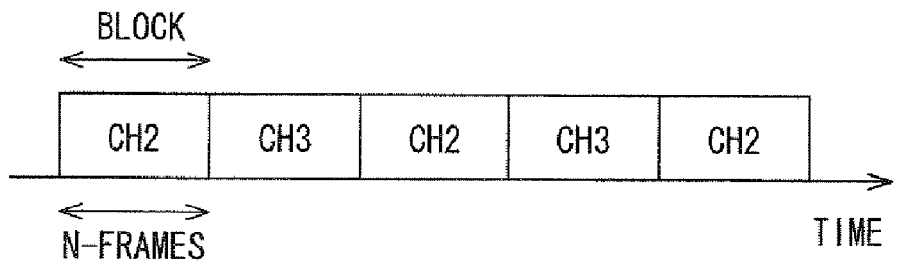
FIG. 7 is a schematic diagram of a first radio signal.

As a second modification, as illustrated in FIG. 7, the smart portable unit 2 continuously transmits the first transmission radio wave and the second transmission radio wave with such timing that they do not overlap. In the example illustrated in FIG. 7 one block is composed of N-frames. Each frame contains a signal indicating a code (smart code, lock command code, or unlock command code).

In the integrated tuner 4, both the first transmission radio wave in Ch2 and the second transmission radio wave in Ch3 are received through the antenna 20. The radio signal in either channel preset as the reception channel is demodulated, and the code (smart code, lock command code, or unlock command code) indicated by the demodulated signal is checked with the code unique to the vehicle. When these codes disagree with each other, the reception channel is changed.

Figure 8:
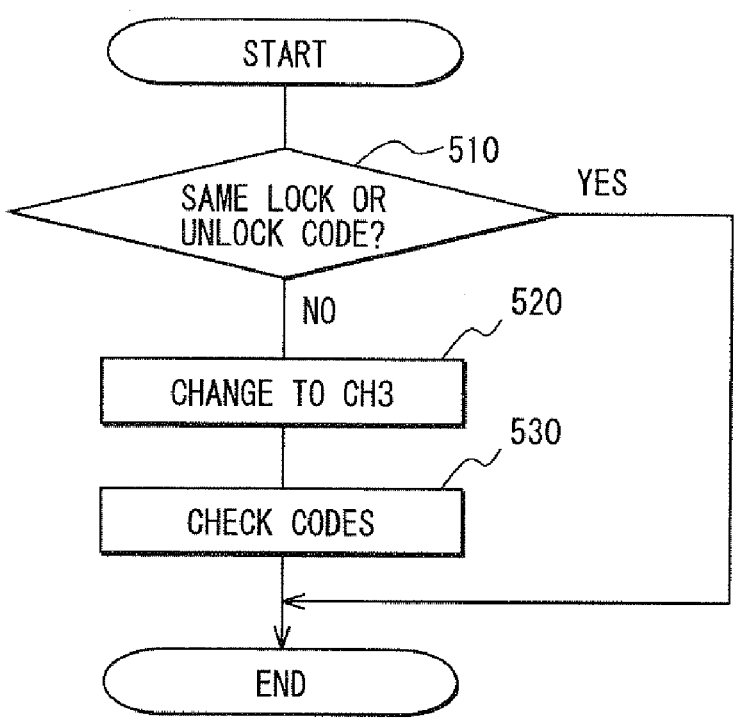
FIG. 8 is a flowchart illustrating second processing carried out by the control IC in communication of the remote keyless entry system.
Figure 9:
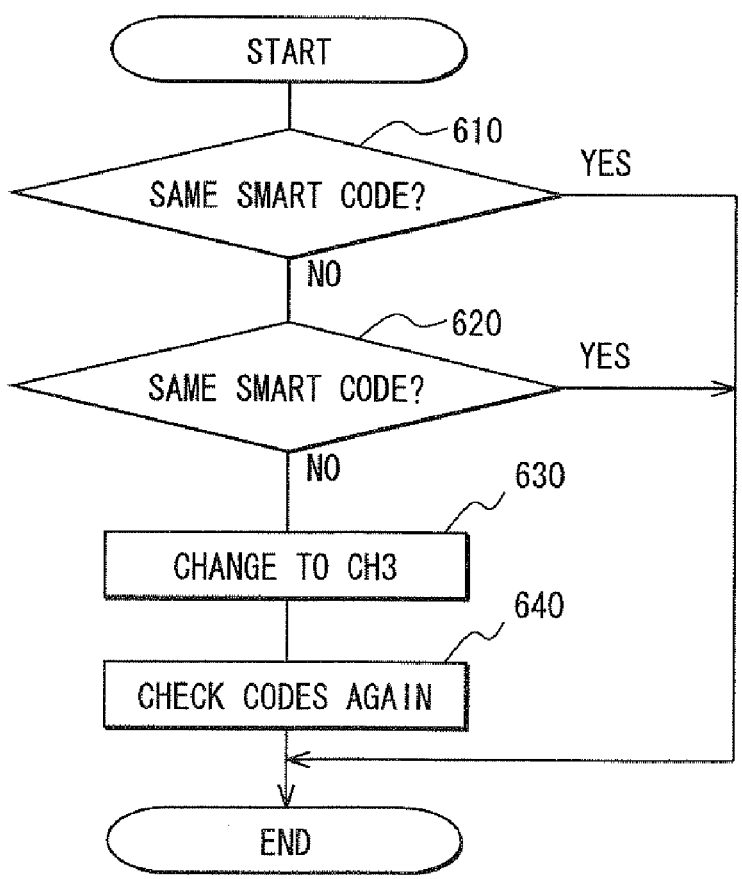
FIG. 9 is a flowchart illustrating second processing carried out by the control IC to execute communication of the smart entry system.

In this modification, the processing in FIG. 8 and FIG. 9 is carried out. In this case, the processing in FIG. 2 or FIG. 6 may be first carried out to set the reception channel or a default reception channel may be preset. In this modification, it is assumed that Ch2 is set as the reception channel by default. In this case, the first transmission radio wave in Ch2 received through the antenna 20 is demodulated.

In the processing in FIG. 8, first, the control IC 38 carries out step 510 to check whether the lock code or unlock code contained in the demodulated signal of the first transmission radio wave is agrees with the code unique to the vehicle. When it is determined that they agree with each other, a signal indicating that is inputted to the smart check ECU 5 and the processing in FIG. 8 is terminated.

When it is determined at step 510 that the lock code or the unlock code does not agree with the code unique to the vehicle, the control IC 38 executes step 520 and changes the reception channel to Ch3.

Then, it executes step 530 and checks the lock code or unlock code contained in the demodulated signal of the second transmission radio wave with the code unique to the vehicle. Thereafter, the processing in FIG. 8 is terminated. When as a result of check, the lock code or the unlock code agrees with the code unique to the vehicle, a signal indicating that is inputted to the smart check ECU 5 and the doors are locked or unlocked. When the lock code or the unlock code disagrees with the code unique to the vehicle, a communication error results.

The control IC 38 executes processing as illustrated in FIG. 9 in communication of the smart entry system. Similarly with the foregoing, it is assumed that Ch2 is preset as the reception channel.

First, the following processing is carried out at step 610: the smart code contained in the demodulated signal is checked with the code unique to the vehicle to determine whether or not they agree with each other. When it is determined that they agree with each other, a signal indicating that is inputted to the smart check ECU 5, and the processing in FIG. 9 is terminated.

When it is determined at step 610 that the smart code contained in the demodulated signal disagrees with the code unique to the vehicle, the control IC 38 executes step 620 and carries out the same processing as step 610. When as a result of check, it is determined that they agree with each other, a signal indicating that is inputted to the smart check ECU 5, and the processing in FIG. 9 is terminated. When it is determined at step 620 that the smart code contained in the demodulated signal disagrees with the code unique to the vehicle, the control IC 38 executes step 630 and changes the reception channel to Ch3.

Then, it executes step 640 and checks again the smart code contained in the demodulated signal of the second transmission radio wave with the code unique to the vehicle. Thereafter, the processing in FIG. 9 is terminated. When as a result of check, the smart code agrees with the code unique to the vehicle, the signal indicating that is inputted to the smart check ECU 5 and the doors are unlocked. When the smart code disagrees with the code unique to the vehicle, a communication error results.

In the second modification, both the first transmission radio wave and the second transmission radio wave are transmitted from the smart portable unit 2. Then, it is determined whether or not the code (smart code, lock command code, or unlock command code) contained in the demodulated signal of the radio signal in the preset reception channel agrees with the code unique to the vehicle. When they disagree with each other, the reception channel is changed, and the code (smart code, lock command code, or unlock command code) contained in the demodulated signal of the radio signal in the channel set as a result of channel change with the code unique to the vehicle. For this reason, checking is successfully carried out, that is, communication is accomplished unless either the demodulated signal of the first transmission radio wave or that of the second transmission radio wave involves an error.

This second modification may be so constructed that the checking processing (steps 510, 530, 610, 620, 640) in FIG. 8 and FIG. 9 is carried out by the smart check ECU 5. In this case, demodulated signals only have to be inputted from the control IC 38 to the smart check ECU 5.

(Second Embodiment)

Figure 10:
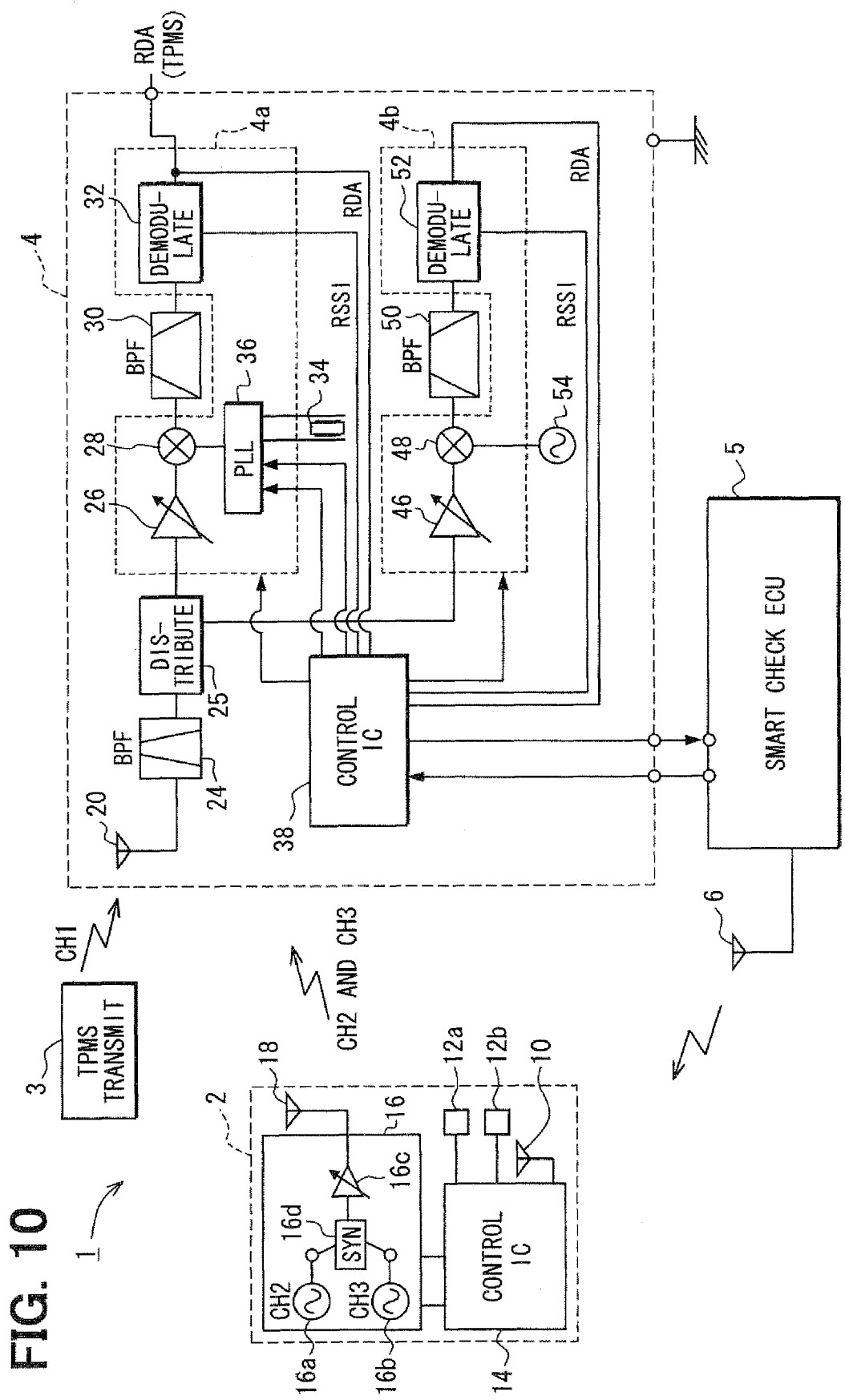
FIG. 10 is a block diagram of a vehicle control system according to a second embodiment of the present invention.

In the second embodiment illustrated in FIG. 10, the first transmission radio wave in Ch2 and the second transmission radio wave in Ch3 are simultaneously transmitted from the smart portable unit 2, and both of them are demodulated in the integrated tuner 4. Hereafter, description will be given only of a difference from the vehicle control system 1 in the first embodiment (FIG. 1).

The transmission module 16 of the smart portable unit 2 includes a synthesizing circuit 16d. The synthesizing circuit 16d synthesizes a signal produced by modulating the carrier wave generated at the carrier generation circuit 16a with the digital signal from the control IC 14 and the signal produced by modulating the carrier wave generated at the carrier generation circuit 16b with the digital signal from the control IC 14. The signal synthesized at the synthesizing circuit 16*d* is supplied to the antenna 18 through the AMP 16*c*.

The integrated tuner 4 has between the BPF 24 and the AMP 26 a distribution circuit 25 for distributing the radio signal received through the antenna 20 to two paths. One signal distributed by the distribution circuit 25 is inputted to the receiver IC 4*a* as in the first embodiment.

In addition to the receiver IC 4*a*, the integrated tuner 4 further includes a receiver IC 4*b*. The receiver IC 4*b* further includes: an amplifier circuit (AMP) 46 that amplifies the other signal distributed by the distribution circuit 25; an oscillator circuit 54 that generates a signal with a certain local frequency (303.65 MHz in this example); a mixer 48 that mixes a signal inputted from the oscillator circuit 54 into a received signal from the AMP 46, and thereby converts the received signal into an intermediate frequency signal of a specific frequency; a band-pass filter (BPF) 50 that selectively lets through the intermediate frequency signal of the specific frequency generated by the mixer 48; and a demodulating circuit 52 that demodulates the intermediate frequency signal of the specific frequency passed through the BPF 50. The control IC 38 detects demodulated signals outputted from the receiver IC 4*b*, more specifically, the demodulating circuit 52. In this embodiment, the signal intensity or the noise level may be detected as in the first embodiment.

Figure 11:
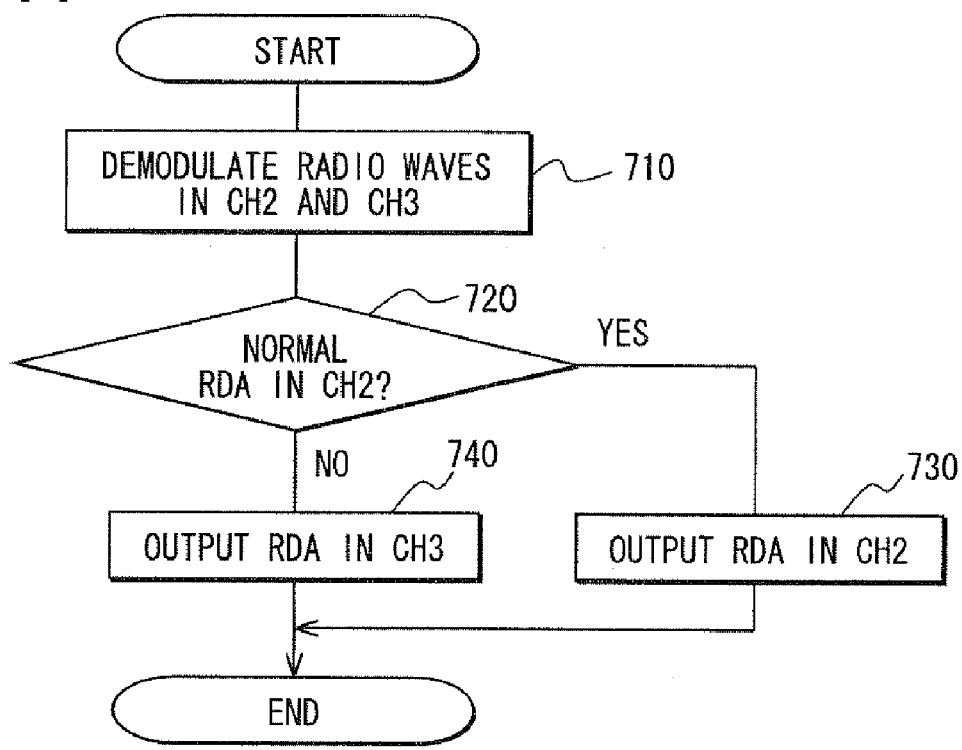
FIG. 11 is a flowchart illustrating third processing carried out by the control IC in communication of the remote keyless entry system.

In the integrated tuner 4, the control IC 38 executes processing illustrated in FIG. 11 in communication of the remote keyless entry system.

When the first transmission radio wave in Ch2 and the second transmission radio wave in Ch3 are received, first, the control IC 38 carries out processing to demodulate the first transmission radio wave and the second transmission radio wave at step 710. Specifically, it controls an input signal to the PLL circuit 36 so that a signal with a predetermined local frequency (301.45 MHz in this example) is inputted to the mixer 28.

In the receiver IC 4*a*, the first transmission radio wave (312.15 MHz) in Ch2 and the second transmission radio wave (314.35 MHz) in Ch3 are mixed with the signal with the local frequency (301.45 MHz) by the mixer 28. Thus, they are respectively converted into an intermediate frequency signal of 10.7 MHz and a signal of 12.9 MHz. Only the intermediate frequency signal of 10.7 MHz passes through the BPF 30 and is inputted to the demodulating circuit 32. Thus, in the receiver IC 4*a*, the first transmission radio wave in Ch2 is converted into the intermediate frequency signal and is demodulated at the demodulating circuit 32.

In the receiver IC 4*b*, the oscillator circuit 54 for generating signals inputted to the mixer 48 of the receiver IC 4*b* oscillates with the certain local frequency (303.65 MHz).

Thus, in the receiver IC 4*b*, the first transmission radio wave (312.15 MHz) in Ch2 and the second transmission radio wave (314.35 MHz) in Ch3 are mixed with a signal with the local frequency (303.65 MHz) by the mixer 48. Thus, they are respectively converted into a signal of 8.5 MHz and an intermediate frequency signal of 10.7 MHz. Only the intermediate frequency signal of 10.7 MHz passes through the BPF 50 and is inputted to the demodulating circuit 52. Thus, in the receiver IC 4*b*, the second transmission radio wave in Ch3 is converted into an intermediate frequency signal and is demodulated at the demodulating circuit 32.

At step 720, subsequently, it is determined whether or not the demodulated signal (RDA) in Ch2 is normal. Specifically, it is determined whether or not the demodulated signal is in accordance with a predetermined coding method (e.g., Manchester coding). In Manchester coding, for example, bit 1 is converted into a signal that falls (from high to low) in the center of one bit period, and bit 0 is converted into a signal that rises (from low to high) in the center of one bit period. Therefore, a high level or a low level does not last for a period longer than one bit period. For this reason, if a high level or a low level lasts for a period longer than one bit period, it can be determined that an error exists in a demodulated signal, that is, a demodulated signal is not normal. When it is detected that a demodulated signal is partly missing or an unwanted signal component is contained in the demodulated signal, it is determined that an error exists in the demodulated signal. When a demodulated signal is free from a missing part or any unwanted signal component is not contained, it is determined that the demodulated signal is normal.

When it is determined at step 720 that the demodulated signal in Ch2 is normal, the control IC 38 executes step 730 and outputs the demodulated signal in Ch2 to the smart check ECU 5. Thereafter, the processing in FIG. 11 is terminated. When it is determined at step 720 that the demodulated signal in Ch2 is not normal, the control IC 38 outputs the demodulated signal in Ch3 to the smart check ECU 5. Thereafter, the processing in FIG. 11 is terminated. When a demodulated signal is normal, it can be presumed that the state of communication is favorable. The processing of steps 710 to 740 thus determines whether a channel state is favorable for communication by determining whether or not the demodulated signal is normal.

The smart check ECU 5 checks the lock command code or unlock command code contained in the inputted demodulated signal with the code unique to the vehicle. When it is determined that they agree with each other, the doors are locked or unlocked. This embodiment may be so constructed that checking of the code (lock command code or unlock command code) is carried out by the control IC 38. In this case, a signal indicating agreement or disagreement is inputted from the control IC 38 to the smart check ECU 5. Based on this input signal, the smart check ECU 5 carries out vehicle control.

Figure 12:
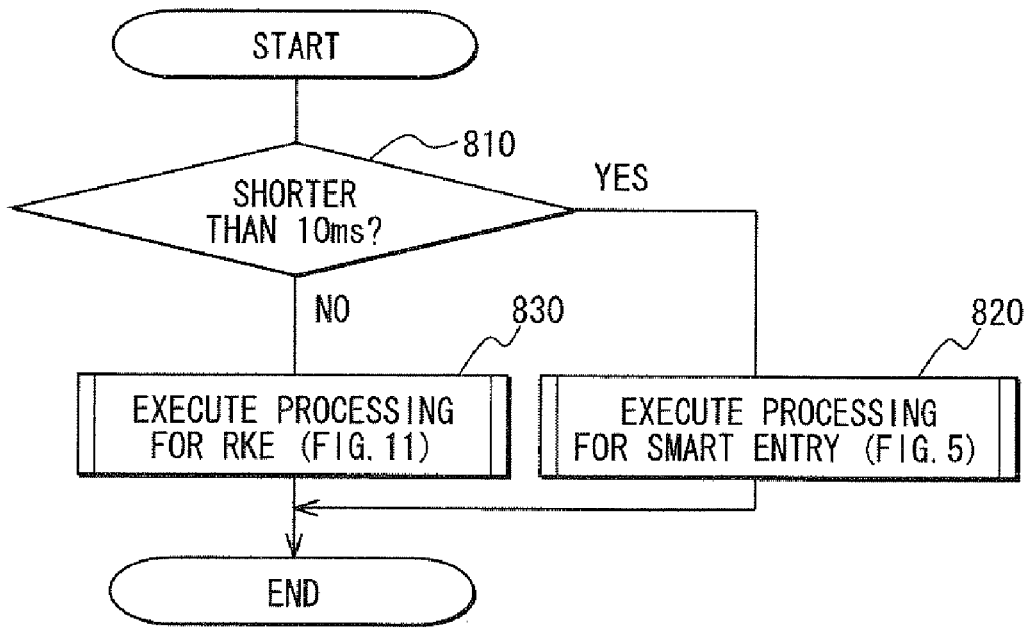
FIG. 12 is a flowchart illustrating third processing carried out by the control IC in communication of the smart entry system.

The control IC 38 executes processing illustrated in FIG. 12 in communication of the smart entry system. In the second embodiment, two different kinds of signals are transmitted from the smart portable unit 2: an acknowledgement signal short in time (shorter than 10 ms) in response to a request signal transmitted from the antenna 6 through processing of the control IC 38 or the smart check ECU 5; and a signal long in time (10 ms or longer) transmitted, for example, after this acknowledgement signal is transmitted.

In this processing, firsts it is determined at step 810 whether a signal transmitted from the smart portable unit 2 is short in time (shorter than 10 ms).

When it is determined that the signal is a short acknowledgement signal, the control IC 38 executes step 820 and carries out the processing in FIG. 5. When it is determined that the signal is not a short acknowledgement signal, that is, the signal is a long signal, the control IC 38 executes step 830 and carries out the processing in FIG. 11.

In the second embodiment, either a TPMS radio signal or the first transmission radio wave can be alternatively selected and demodulated at the receiver IC 4*a*. That is, a circuit and the like (antenna 20, receiver IC 4*a*, etc.) can be used both to receive the TPMS radio signal and to receive the first transmission radio wave. For this reason, it is possible to suppress increase in the size and cost of the configuration of the integrated tuner 4 and eventually the entire system.

Of the demodulated signal the first transmission radio wave and that of the second transmission radio wave, a normal one (demodulated signal in accordance with an coding method) is checked. Therefore, the probability that checking will be successfully carried out can be enhanced. As a result, it can be ensured that communication is more reliably carried out.

The second embodiment may be modified so that the processing of step 810 is carried out by the smart check ECU 5. In this case, the result of the determining processing of step 810 is inputted from the smart check ECU 5 to the control IC 38, and the control IC 38 carries out the processing of step 820 (FIG. 5) or the processing of step 830 (FIG. 11).

(Third Embodiment)

Figure 13:
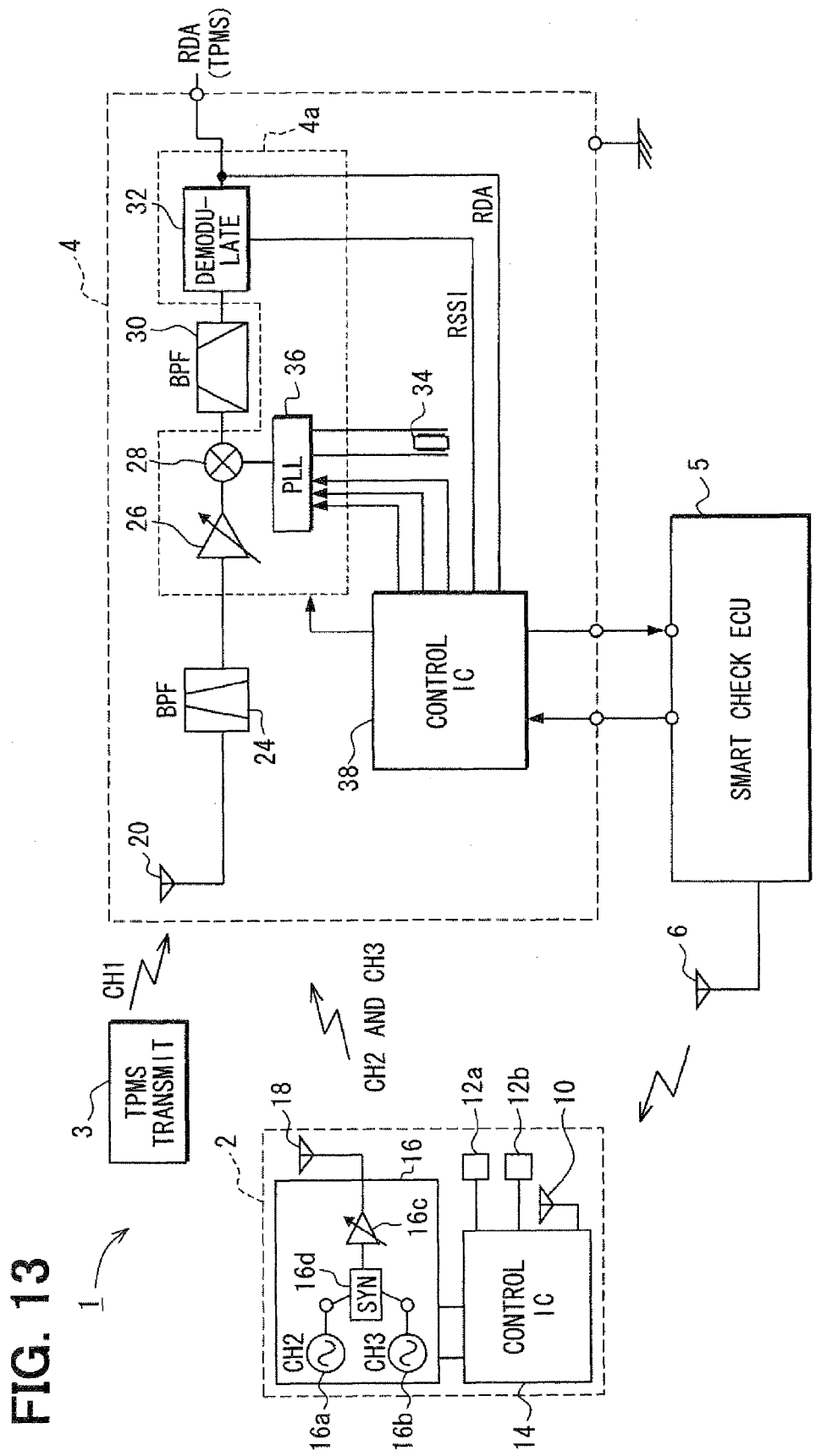
FIG. 13 is a block diagram of a vehicle control system according to a third embodiment of the present invention.

In the third embodiment, as shown in FIG. 13, the transmission module 16 of the smart portable unit 2 synthesizes the signal in Ch2 and the signal in Ch3 by the synthesizing circuit 16*d* and the synthesized signal is supplied to the antenna 18. The first transmission radio wave in Ch2 and the second transmission radio wave in Ch3 are simultaneously transmitted from the antenna 18 as in the second embodiment.

The control IC 38 periodically carries out the processing in FIG. 2 while the ignition switch is in the OFF state and sets the reception channel in advance. It carries out the processing in FIG. 3 and FIG. 4 in communication of the remote keyless entry system and the processing in FIG. 4 and FIG. 5 in communication of the smart entry system. The reception channel may be set by the processing illustrated in FIG. 6.

In the third embodiment, a circuit and the like (antenna 20, receiver IC 4*a*, etc.) can be used both to receive TPMS radio signals and to receive radio signals transmitted from the smart portable unit 2. Therefore, it is possible to suppress increase in the size and cost of the configuration of the integrated tuner 4 and eventually the entire system.

When the demodulated signal of the radio signal transmitted from the smart portable unit 2 is acquired, the demodulated signal of the radio signal in a channel in which the noise level is lower (or a channel in which the RSSI level indicating a received signal intensity indicator is higher) is acquired. Therefore, the probability that data (smart code, lock command code, or unlock command code) transmitted from the portable unit 2 can be accurately received is enhanced. As a result, it can be ensured that communication is more reliably carried out.

(Third Modification)

As the third modification, the third embodiment may be modified so that the control IC 38 carries out the processing illustrated in FIG. 8 in communication of the remote keyless entry system and the processing in FIG. 9 in communication of the smart entry system, in place of the processing in FIG. 2 to FIG. 6. In this case, the processing in FIG. 2 or FIG. 6 may be carried out to set the reception channel in advance. The reception channel may be set by default.

In the third modification, it is determined whether or not the code (smart code, lock command code, or unlock command code) contained in the demodulated signal of the radio signal in the preset reception channel agrees with the code unique to the vehicle. When they disagree with each other, the reception channel is changed. Then, the code (smart code, lock command code, or unlock command code) contained in the demodulated signal of the radio signal in the channel set as a result of the reception channel change is checked with the code unique to the vehicle. For this reason, checking is successfully carried out, that is, communication is accomplished as long as either the demodulated signal of the first transmission radio wave or that of the second transmission radio wave is free from an error (Fourth Modification)

As the fourth modification, the control IC 38 carries out the processing in FIG. 11 in communication of the remote keyless entry system and the processing in FIG. 12 in communication of the smart entry system, in place of the processing in FIG. 3 to FIG. 5.

In the fourth modification, a normal one (demodulated signal in accordance with an coding method) of the demodulated signal of the first transmission radio wave and that of the second transmission radio wave is checked. Therefore, the probability that checking will be successfully carried out can be enhanced. As a result, it can be ensured that communication is more reliably carried out.

(Fourth Embodiment)

Figure 14:
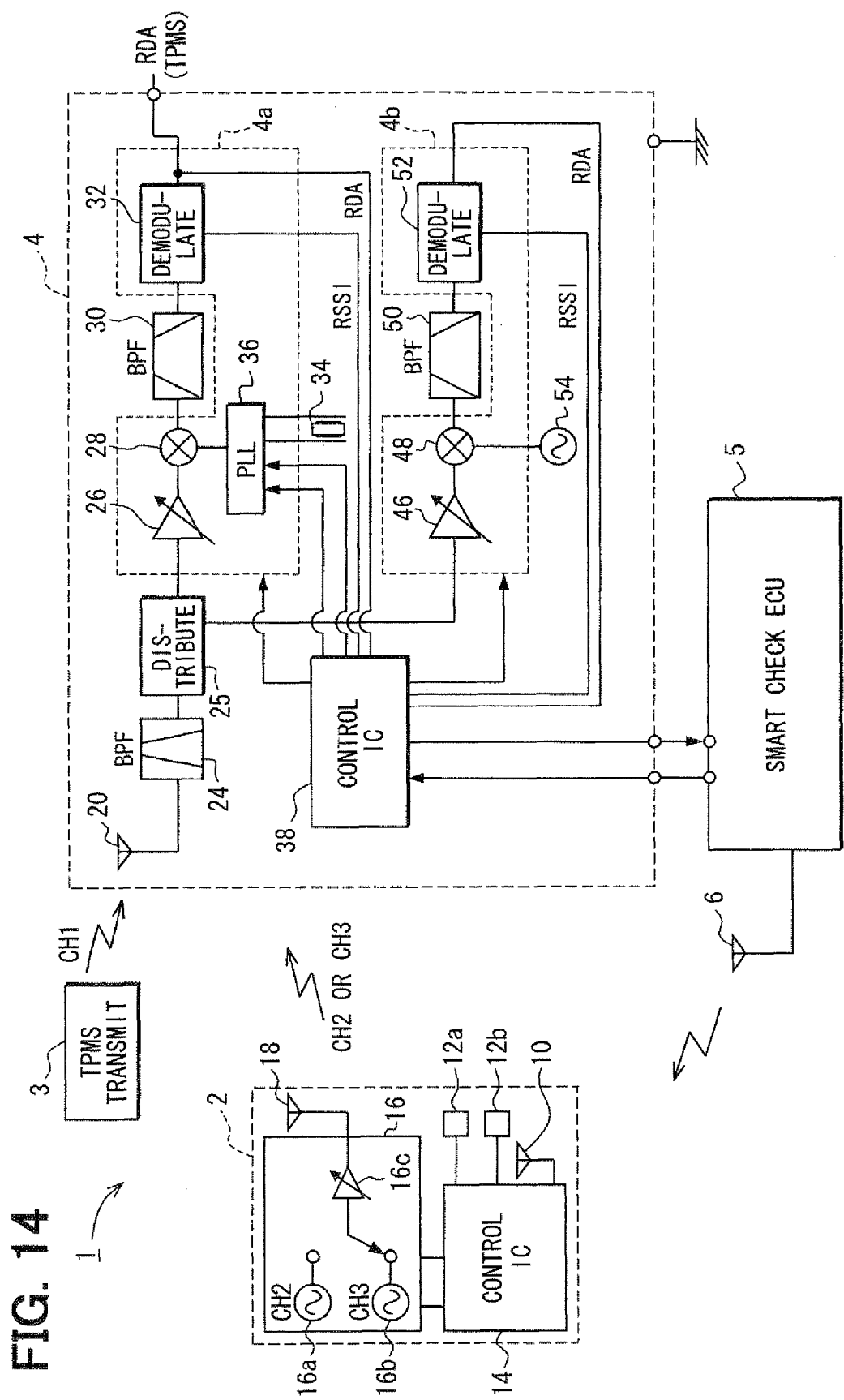
FIG. 14 is a block diagram of a vehicle control system according to a fourth embodiment of the present invention.

In the fourth embodiment, as illustrated in FIG. 14, the vehicle control system 1 includes the smart portable unit 2 of the same configuration as in the first embodiment, and the integrated tuner 4 of the same configuration as in the second embodiment.

The smart portable unit 2 generates the radio signal by using the same method in both the remote keyless entry system and in the smart entry system. It is assumed here that a code (smart code, lock command code, or unlock command code) to be transmitted is "10110010" as an example.

The control IC 14 controls the transmission module 16 so that the following is implemented according to the logical value of each bit of the code: in the case of logical "1," the radio signal is transmitted through Ch2 during the corresponding one bit period; and in the case of logical "0," the radio signal is transmitted through Ch3 during the corresponding one bit period. On each radio signal, the logical value data of the next bit is superimposed.

Figure 15A:
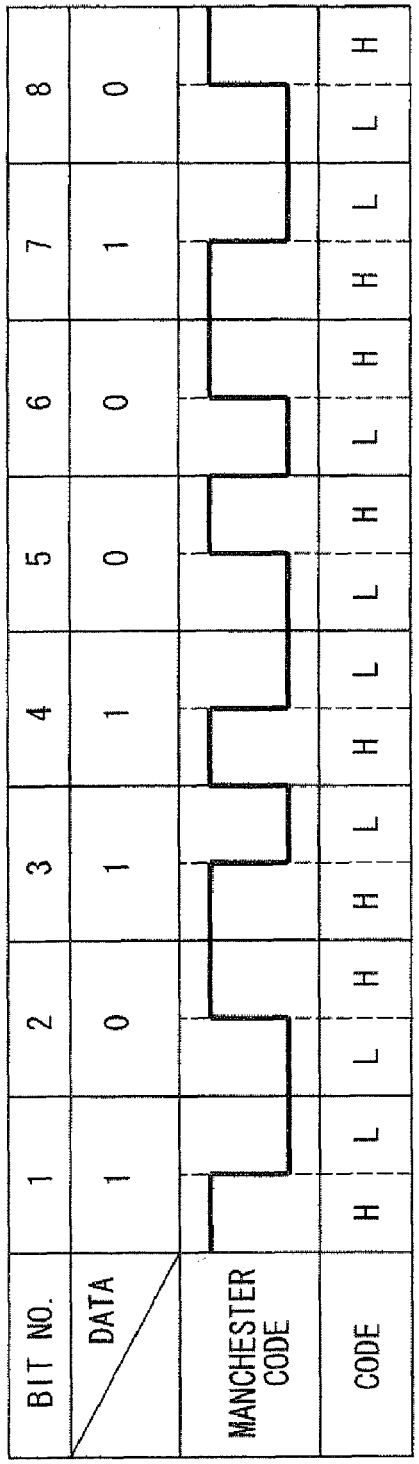
FIGS. 15A and 15B are first explanatory diagrams of a first radio signal in the fourth embodiment.

As more specifically illustrated in FIG. 15A, the control IC 14 converts the code (10110010) to be transmitted into a Manchester code. That is, the logical "1" in the data is converted into a signal that falls (from high to low) in the center of the corresponding one bit period; and the logical "0" is converted into a signal that rises (from low to high) in the center of the corresponding one bit period.

Then, radio signal is generated based on the logical value of each bit and the Manchester coding. Since the first bit is a logical "1," the control IC 14 inputs a setting command for Ch2 to the transmission module 16. Since the second bit is a logical "0'," the control IC 14 inputs a digital signal representing logical "0" that rises from low to high to the transmission module 16.

Figure 15B:
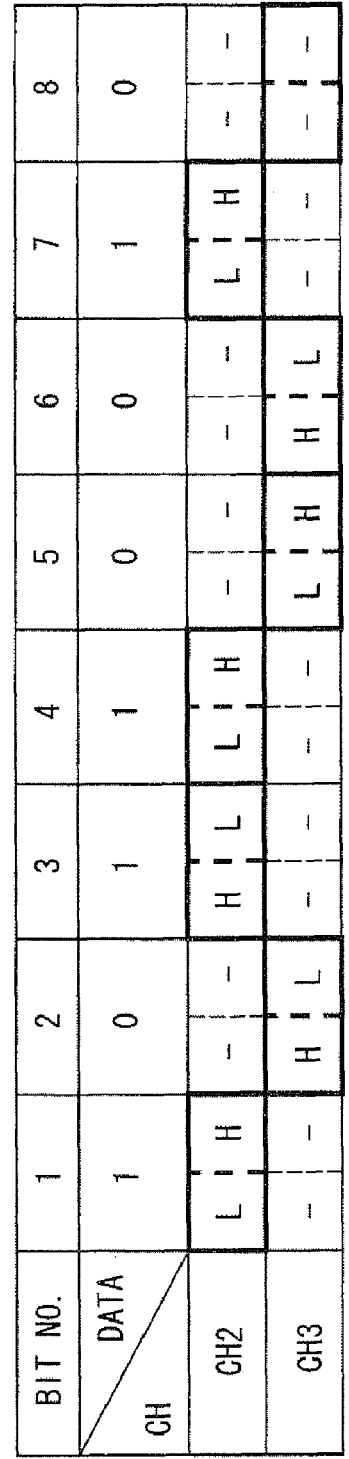

As schematically illustrated in FIG. 15B, consequently, the following radio signal is generated by the transmission module 16: a radio signal produced by modulating a carrier wave (Ch2) generated by the carrier generation circuit 16*a* with a digital signal representing logical "0." The thus generated signal is supplied to the antenna 18 and transmitted from the antenna 18.

Since the second bit is a logical "0," the control IC 14 subsequently inputs a setting command for Ch3 to the transmission module 16. Since the third bit is a logical "1," the control IC 14 inputs a digital signal representing logical "1" that falls from high to low to the transmission module 16.

In the transmission module 16, consequently, the following radio signal is generated: a radio signal produced by modulating a carrier wave (Ch3) generated by the carrier generation circuit 16*b* with a digital signal representing logical "1". The thus generated signal is supplied to the antenna 18 and transmitted from the antenna 18.

Hereafter, the radio signals are sequentially generated and transmitted. With respect to the eighth bit, the control IC 14 does not output a digital signal because the next bit does not exist. Since the eighth bit is logical "0," the carrier wave in Ch3 is transmitted without anything superimposed thereon (FIG. 15B).

Figure 16:
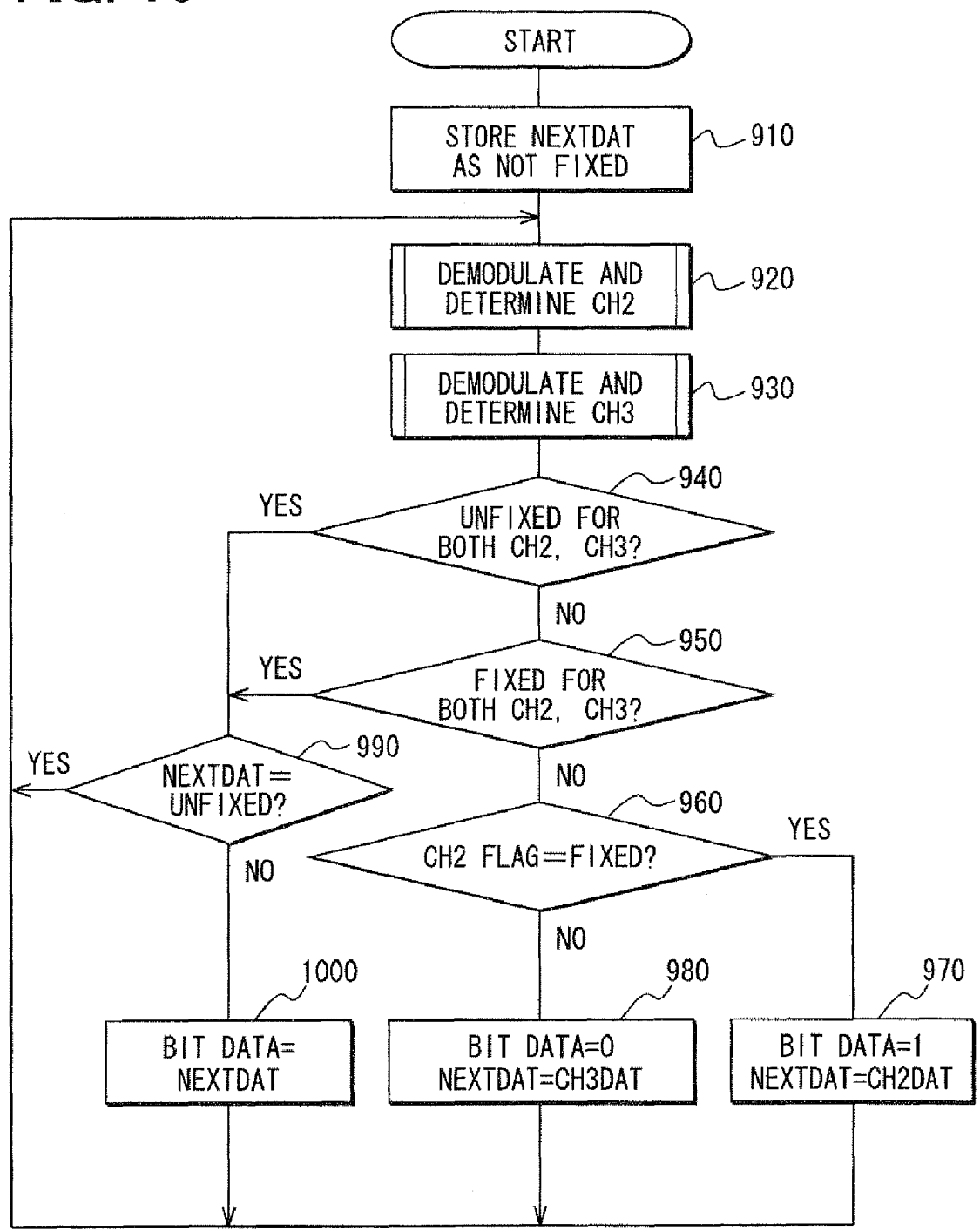
FIG. 16 is a flowchart illustrating first decoding processing carried out by the control IC.
Figure 17:
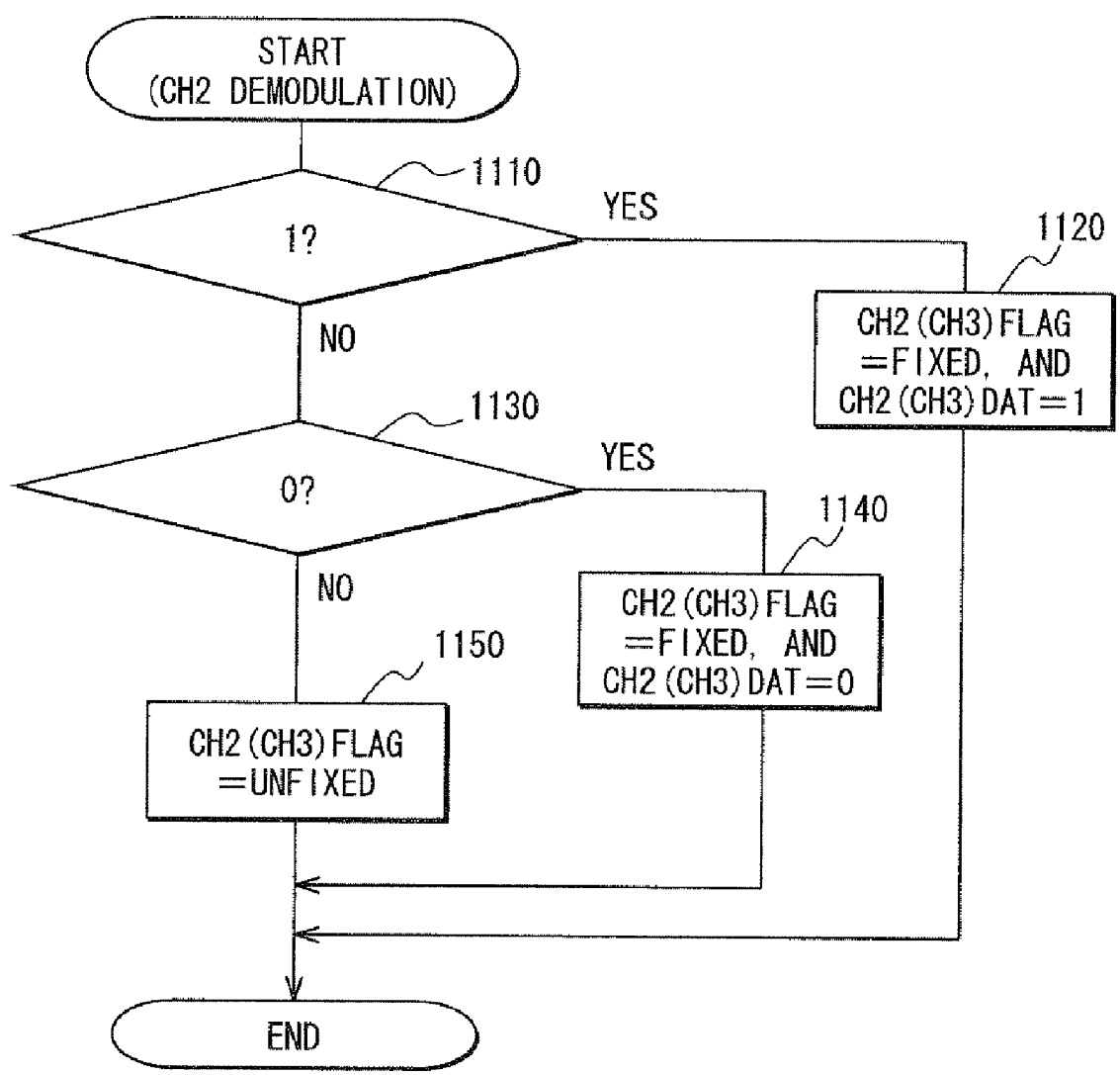
FIG. 17 is a flowchart illustrating second decoding processing carried out by the control IC.

In the integrated tuner 4, the control IC 38 carries out the processing illustrated in FIGS. 16 and 17. The processing in FIG. 16 is started in time with the acknowledgement signal of the portable unit 2, which is in response to the request signal transmitted from the antenna 6 on the vehicle.

The control IC 38 repeatedly carries out the processing of step 920 to step 1000 in every one bit period. It thereby identifies the logical value data contained in the radio signal transmitted from the smart portable unit 2 to decode the entire code.

In the processing in FIG. 16, it is stored in a predetermined storage area at step 910 that logical value data contained in the radio signal has not been fixed (confirmed) yet. This logical value data is the logical value data of the next bit and defined as "nextdat."

The control IC 38 executes step 920 and carries out processing for demodulating the radio signal in Ch2 and processing for identifying the logical value data represented by its demodulated signal. Specifically, it carries out the processing in FIG. 17. It is assumed that the radio signal in Ch2 is received and its demodulated signal is inputted to the control IC 38.

At step 1110, first, the control IC 38 determines whether or not the demodulated signal is a signal representing "1" (signal that transitions from high level to low level). When it is determined that the demodulated signal is a signal representing "1," the control IC 38 determines that it could identify the logical value data represented by the demodulated signal. Then, it executes step 1120 and sets a flag indicating that the logical "1" has been fixed (confirmed) for Ch2. Further, it stores "1" (determined at step 1110) in the predetermined storage area as the logical value data (Ch2dat) contained in the demodulated signal in Ch2. Thereafter, the processing in FIG. 17 is terminated.

When it is determined at step 1110 that the demodulated signal is not a signal representing "1," the control IC 38 executes step 1130. Then, it determines whether or not the demodulated signal is a signal representing "0" (signal that transitions from low level to high level). When it is determined that the demodulated signal is a signal representing "0," the control IC 38 determines that it could identify the logical value data represented by the demodulated signal. Then, it executes step 1140 and sets a confirmation flag indicating that the logical "0" has been fixed for Ch2. Further, it stores "0" (determined at step 1130) in the predetermined storage area as the logical value data (Ch2dat) contained in the demodulated signal in Ch2. Thereafter, the processing in FIG. 17 is terminated.

When it is determined at step 1130 that the demodulated signal is not a signal representing "0" either, the control IC 38 executes step 1150 and sets a flag indicating that the logical "0" has not been fixed for Ch2. Thereafter, the processing in FIG. 17 is terminated.

When the received radio signal is the radio signal in Ch3, negative determinations are made at both steps 1110 and 1130, and a flag indicating "unfixed" for Ch2 is set at step 1150.

After carrying out the processing in FIG. 17 at step 920, the control IC 38 executes step 930 and carries out processing for demodulating the radio signal in Ch3 and processing for identifying the logical value data represented by its demodulated signal. Specifically, the same processing as FIG. 17 is carried out for Ch3. The control IC 38 then executes step 940 and determines whether or not both flags for Ch2 and Ch3 are unfixed. When a negative determination is made, the control IC 38 executes step 950. At step 950, it determines whether or not both flags for Ch2 and Ch3 are fixed. When a negative determination is made, the control IC 38 executes step 960.

At step 960, the control IC 38 determines whether or not the flag for Ch2 is fixed. When it is determined that the flag is fixed, the control IC 38 executes step 970 and stores the logical "1" in the predetermined storage area. Further, it reads Ch2dat as the logical value data (nextdat) of the bit next to the current bit (bit of logical "1"), and stores it in the predetermined storage area. Ch2dat is either "1" stored at step 1120 or "0" stored at step 1140 in FIG. 17.

When it is determined at step 960 that the flag for Ch2 is not fixed, that is, the flag for Ch2 is unfixed, the control IC 38 determines that the flag for Ch3 is fixed and executes step 980. At step 980, it stores the logical "0" in the predetermined storage area. Further, it reads Ch3dat as the logical value data (nextdat) of the bit next to the current bit (bit of logical "0"), and stores it in the predetermined storage area. Ch3dat is either "1" stored at step 1120 or "0" stored at step 1140 in FIG. 17.

When it is determined at step 940 that both the flag for Ch2 and that for Ch3 are unconfirmed flags or it is determined at step 950 that both flags for Ch2 and Ch3 are fixed, the control IC 38 executes step 990.

At step 990, it determines whether or not the nextdat is unfixed, in other words, whether or not the data (Ch2dat or Ch3dat) as nextdat is stored in the predetermined storage area. When it is determined that nextdat is not unfixed (Ch2dat or Ch3dat is stored), the control IC 38 executes step 1000. It acquires this nextdat as logical value data and stores it in the predetermined storage area. For example, it acquires logical "1" when nextdat is "1" and logical "0" when nextdat is "0" and stores it in the predetermined storage area.

When it is determined at step 990 that nextdat is unfixed, the control IC 38 executes step 920 and analyses the next radio signal. When it is determined at step 990 that nextdat is unfixed, the same data as the logical value data of the immediately preceding bit is acquired.

Specifically, the logical value of a bit whose logical value cannot be fixed becomes "1" when the immediately preceding bit is of logical "1" and "0" when the immediately preceding bit is of logical "0."

With respect to the eighth bit in this example, the radio signal does not contain the bit data of the next bit. Therefore, a negative determination will be made at step 1110 and at step 1130, and thus an unfixed flag is set at step 1150. In the processing in FIG. 17 for the seventh bit in this case, a negative determination is made at step 1110 and an affirmative determination is made at step 1130. At step 1140, Ch2dat=0 is stored, and at step 970 in FIG. 16, nextdat=Ch2dat(=0) is stored. At step 1000 for the eighth bit, therefore, the data of the eighth bit is recognized as nextdat, that is, "0."

In the fourth embodiment, the processing in FIG. 16 may be carried out by an amount equivalent to a predetermined number of bits and then terminated, or carried out for a preset time and then terminated.

Thus, the control IC 38 identifies the logical value data contained in the radio signal transmitted from the smart portable unit 2 based on the radio signal and decodes them.

The code into which the signals are decoded is inputted to the smart check ECU 5. The smart check ECU 5 checks the inputted code with the code unique to the vehicle. When they agree with each other, it carries out the predetermined vehicle control. When they disagree with each other, a communication error results.

As described above, the vehicle control system 1 in the fourth embodiment is so constructed that the logical value data of each bit of a code to be transmitted is represented using the kind of a channel and the data signal of a radio signal. The logical value data of the current bit and the logical value data of the next bit can be represented by the radio signal in one bit period. For this reason, even when the radio signal in a specific bit period cannot be received due to noise or the like, the logical value data of the specific bit can be restored from the data signal, that is, the demodulated signal of the radio signal in the preceding bit period. Therefore, the probability that signals can be correctly decoded can be enhanced. As a result, it can be ensured that communication is more reliably carried out.

The logical value data involved into the radio signal may be the logical value data of the bit preceding the current bit. Data to be transmitted may be multivalued (e.g., ternarized, quaternarized). In this case, the number of channels only has to be increased (to three or above).

In this embodiment, the processing of steps 920 to 1150 corresponds to an authentication code restoring means.

(Fifth Modification)

Figure 18:
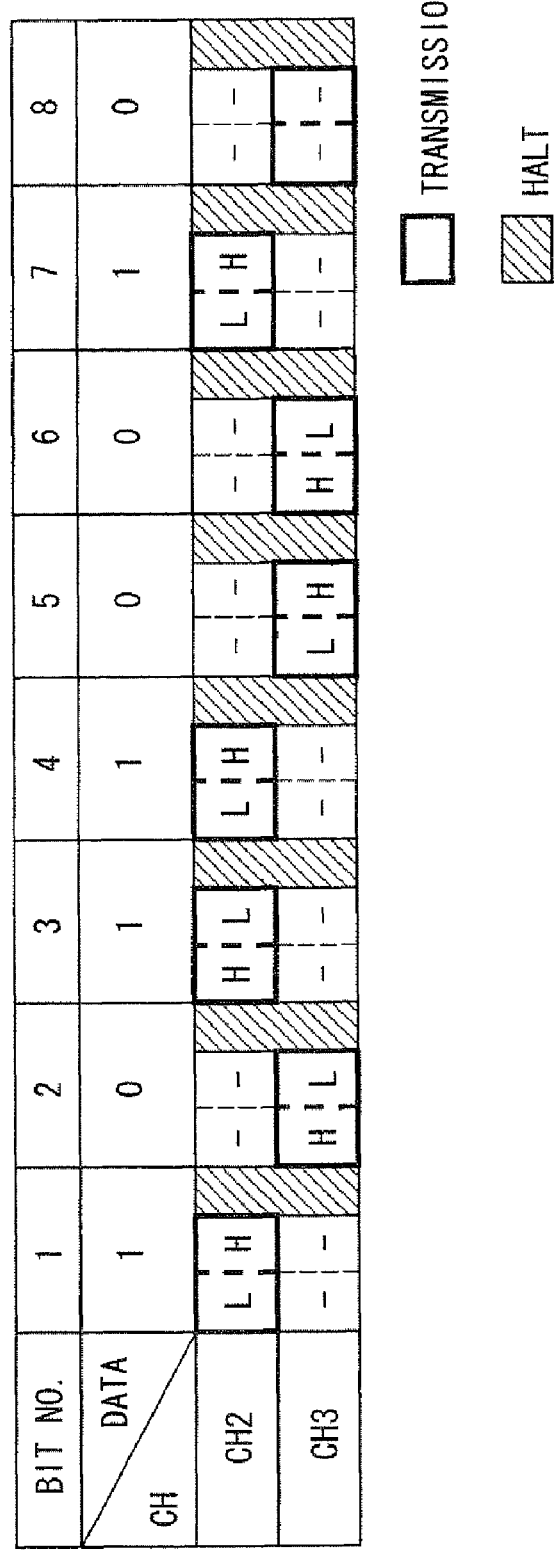
FIG. 18 is a second explanatory diagram of the first radio signal in the fourth embodiment.

As the fifth modification, the fourth embodiment may be modified as illustrated in FIG. 18. In the fifth modification, each bit is provided at the end of the corresponding one bit period with a section regardless of the representation of the logical value of the bit. This section is referred to as a halt (halt) interval. The periods equivalent to the halt intervals are allocated to channel change operation in the transmission module 16. For this reason, logical value data can be reliably involved into radio signals. As a result, it can be ensured that a code to be transmitted is accurately transmitted. The halt interval may be provided at the beginning of one bit period.

Many other modifications may be made in the foregoing embodiments.

For instance, the number of frequency channels may be three or more. In such a case, there is the possibility that two or more channels are not under the charge of the receiver IC 4a. In this case, the control system 1 may be so constructed that the receiver IC 4b selects any of radio signals in two or more channels and demodulates it. Alternatively, it may be so constructed that a receiving IC is provided on a channel-by-channel basis.

A received signal intensity indicator (RSSI) circuit for detecting the signal intensity of demodulated signals may be separately provided. In this case, the signal intensity detected through the RSSI circuit may be inputted to the control IC 38.

The keyless entry system need not have both functions of a remote keyless entry system and a smart entry system. The smart entry system may periodically transmit a request signal. The TPMS and the keyless entry system need not be integrated with each other, and the vehicle control system may be so constructed that it only has the keyless entry system. The reception channel set by the reception channel setting processing (FIG. 2 and FIG. 6) may be stored when the ignition switch is turned off to stop the engine, and the first radio signal may be received by the stored reception channel when the ignition switch is thereafter turned on. In this case, this reception channel setting processing can be carried out when a predetermined time has passed after the ignition switch is turned on.

What is claimed is:

1. A vehicle control system comprising:
a portable unit carried by a user of a vehicle for transmitting a first radio signal for a keyless entry system for remotely operating equipment of the vehicle;
a vehicle condition detector mounted in the vehicle for transmitting a second radio signal for a vehicle condition monitoring system; and
an in-vehicle receiver mounted in the vehicle for receiving the first radio signal and the second radio signal,
wherein the portable unit transmits the first radio signal through a plurality of channels different in frequency, and
wherein the in-vehicle receiver includes:
a receiving antenna for receiving the first radio signal and the second radio signal;
a channel determining unit for determining an optimal channel, which is in a most favorable state of communication, among the plurality of channels;
a frequency conversion unit selecting either the first radio signal or the second radio signal in any of the plurality of channels from among signals received by the receiving antenna and converting the signal into an intermediate frequency signal of a specific frequency;
a demodulating unit for demodulating the intermediate frequency signal outputted from the frequency conversion circuit; and
a controlling unit for causing the frequency conversion unit to select the second radio signal when a demodulated signal of the second radio signal is to be acquired by the controlling unit from the demodulating unit, and causing the frequency conversion unit to select the first radio signal in the optimal channel determined by the channel determining unit when a demodulated signal of the first radio signal is to be acquired by the controlling unit from the demodulating unit
wherein:
the channel determining unit includes an accordance determining unit for determining whether or not the demodulated signal of the first radio signal received by the antenna is in accordance with a coding method with respect to each of the plurality of channels, and determines a channel which is in accordance with predetermined coding method, with respect to the demodulated signal by the accordance determining unit as the optimal channel;
the in-vehicle receiver includes an optimal channel changing unit for checking an authentication code contained in the demodulated signal of the first radio signal with an authentication code unique to the vehicle, and for changing the optimal channel determined by the channel determining unit when these codes disagree with each other;
the in-vehicle receiver includes a channel notifying the portable unit of the optimal channel determined by the channel determining unit; and
the portable unit transmits the first radio signal in the optimal channel notified by the channel notifying unit.

2. The vehicle control system of claim 1, wherein:
the frequency conversion unit includes a mixer for mixing signals received by the receiving antenna with a signal for conversion and converting either the first radio signal or the second radio signal into the intermediate frequency signal of a specific frequency, and a circuit for generating a signal for conversion; and
the frequency conversion unit converts a frequency of the signal for conversion into a frequency for either the first radio signal in any of the plurality of channels or the second radio signal to be converted into the intermediate frequency signal of a specific frequency by the mixer.

3. The vehicle control system of claim 1, wherein:
the portable unit includes a circuit for generating a plurality of carrier waves different in frequency; and the portable unit modulates the carrier wave of the frequency of the optimal channel among a plurality of carrier waves with a data signal containing data to be transmitted, and transmits the modulated signal as the first radio signal.

4. The vehicle control system of claim 1, wherein:
the channel determining unit includes a noise level detecting unit for detecting the noise level of a received signal received by the antenna with respect to each of the plurality of channels, and determines a channel, which is in a lowest noise level, as the optimal channel based on a result of detection by the noise level detecting unit.

5. The vehicle control system of claim 1, wherein:
the channel determining unit includes a signal intensity detecting unit for detecting the signal intensity of a received signal received by the antenna with respect to each of the plurality of channels, and determines a channel, which is in a highest signal intensity, as the optimal channel based on a result of detection by the signal intensity detecting unit.

6. The vehicle control system of claim 1, wherein:
the in-vehicle receiver includes a change command notifying unit for notifying the portable unit of a change command for the signal intensity of the first radio signal; and
the portable unit changes the signal intensity of the first radio signal according to the change command for signal intensity notified by the change command notifying unit.

7. The vehicle control system of claim 1, wherein:
the vehicle condition detector includes a tire air pressure detector fitted to a wheel of the vehicle for transmitting the second radio signal for a tire monitoring system.

8. A vehicle control system comprising:
a portable unit carried by a user of a vehicle for transmitting a first radio signal for a keyless entry system for remotely operating equipment of the vehicle;
a vehicle condition detector mounted in the vehicle for transmitting a second radio signal for a vehicle condition monitoring system; and
an in-vehicle receiver mounted in the vehicle and receiving the first radio signal and the second radio signal,
wherein the portable unit transmits the first radio signal through a plurality of channels different in frequency, and
wherein the in-vehicle receiver includes:
  a receiving antenna for receiving the first radio signal and the second radio signal;
  a first frequency conversion unit for selecting either the first radio signal in any of the plurality of channels or the second radio signal from among the signals received by the receiving antenna, and converting the signal into an intermediate frequency signal of a specific frequency;
  a second frequency conversion unit for converting the first radio signal in a channel not under control of the first frequency conversion circuit into an intermediate frequency signal of a specific frequency;
  a first demodulating unit for demodulating the intermediate frequency signal outputted from the first frequency conversion unit; and
  a second demodulating unit for demodulating the intermediate frequency signal outputted from the second frequency conversion unit;
wherein the in-vehicle receiver includes a channel determining unit for determining an optimal channel, which is in the most favorable state of communication, among the plurality of channels, and a controlling unit;
wherein the controlling unit causes the first frequency conversion unit to select the second radio signal and acquires a demodulated signal outputted from the first demodulating unit when the demodulated signal of the second radio signal is to be acquired;
wherein the controlling unit causes the first frequency conversion unit to select the first radio signal in the optimal channel and the controlling unit acquires the demodulated signal outputted from the first demodulating unit if the optimal channel determined by the channel determining unit is under control of the first frequency conversion unit, when the demodulated signal of the first radio signal is to be acquired; and
wherein the controlling unit acquires the demodulated signal outputted from the second demodulating unit when the demodulated signal of the first radio signal is to be acquired if the optimal channel determined by the channel determining unit is under control of the second frequency conversion unit, when the demodulated signal of the first radio signal is to be acquired.

9. The vehicle control system of claim 8, wherein:
the first frequency conversion unit includes a mixer for mixing signals received by the receiving antenna with a signal for conversion and converting either the first radio signal in any of the plurality of channels or the second radio signal among the received signals into the intermediate frequency signal of a specific frequency, and a circuit for generating the signal for conversion; and
the first frequency conversion unit converts the frequency of the signal for conversion into a frequency for either the first radio signal in any of the plurality of channels or the second radio signal to be converted into the intermediate frequency signal of a specific frequency by the mixer.

10. The vehicle control system of claim 8, wherein:
the portable unit includes a circuit for generating a plurality of carrier waves different in frequency; and
the portable unit respectively modulates the plurality of carrier waves generated by the circuit with a data signal containing data to be transmitted and synthesizes and simultaneously transmits the modulated signals.

11. The vehicle control system of claim 8, wherein:
the channel determining unit includes a noise level detecting unit for detecting the noise level of a received signal received by the antenna with respect to each of the plurality of channels, and determines a channel, which is in a lowest noise level, as the optimal channel based on a result of detection by the noise level detecting unit.

12. The vehicle control system of claim 8, wherein:
the channel determining unit includes a signal intensity detecting unit for detecting the signal intensity of a received signal received by the antenna with respect to each of the plurality of channels, and determines a channel, which is in a highest signal intensity, as the optimal channel based on a result of detection by the signal intensity detecting unit.

13. The vehicle control system of claim 8, wherein:
the channel determining unit includes an accordance determining unit for determining whether or not the demodulated signal of the first radio signal received by the antenna is in accordance with a coding method with respect to each of the plurality of channels, and determines a channel which is in accordance with a predetermined coding method, with respect to the demodulated signal by the accordance determining unit as the optimal channel.

14. The vehicle control system of claim 8, wherein:
the in-vehicle receiver includes an optimal channel changing unit for checking an authentication code contained in the demodulated signal of the first radio signal with an authentication code unique to the vehicle, and for changing the optimal channel determined by the channel determining unit when these codes disagree with each other.

15. A vehicle control system comprising:
a portable unit carried by a user of a vehicle for transmitting a first radio signal for a keyless entry system for remotely operating equipment of the vehicle;
a vehicle condition detector mounted in the vehicle for transmitting a second radio signal for a vehicle condition monitor system; and
an in-vehicle receiver mounted in the vehicle and receiving the first radio signal and the second radio signal,
wherein the portable unit transmits the first radio signal through a plurality of channels different in frequency, and
wherein the in-vehicle receiver includes:
    a receiving antenna for receiving the first radio signal and the second radio signal;
    a first frequency conversion unit for selecting either the first radio signal in any of the plurality of channels or the second radio signal from among the signals received by the receiving antenna, and converting the signal into an intermediate frequency signal of a specific frequency;
    a second frequency conversion unit for converting the first radio signal in a channel not under control of the first frequency conversion circuit into an intermediate frequency signal of a specific frequency;
    a first demodulating unit for demodulating the intermediate frequency signal outputted from the first frequency conversion unit; and
    a second demodulating unit for demodulating the intermediate frequency signal outputted from the second frequency conversion unit; wherein:

the portable unit transmits the first radio signal through first and second channels different in frequency, and transmits in each bit period the first radio signal of the first radio signal based on a logical value of each bit of data to be transmitted, the first radio signal being of the first channel and containing a logical value data of the bit next to that bit when that bit is logical 1, and the first radio signal being of the second channel and containing the logical value data of the bit next to that bit when that bit is logical 0; and
the in-vehicle receiver includes a data restoring unit for restoring data transmitted from the portable unit, by setting a current logical value to 1 when the logical value contained in the demodulated signal of the first radio signal in the first channel is identified, by setting the current logical value to 0 when the logical value contained in the demodulated signal of the first radio signal in the second channel is identified, and by taking the logical value identified with respect to the demodulated signal of the first radio signal received immediately before as the current logical value when the both logical values are or are not identified with respect to both the first channel and the second channel.

16. The vehicle control system of claim 15, wherein:
a data signal contained in the first radio signal is provided at either or both of a beginning and an end of each bit period with a section regardless of the representation of the logical value of that bit.

17. The vehicle control system of claim 15, wherein:
the in-vehicle receiver includes a change command notifying unit for notifying the portable unit of a change command for the signal intensity of the first radio signal; and
the portable unit changes the signal intensity of the first radio signal according to the change command for signal intensity notified by the change command notifying unit.

18. The vehicle control system of claim 15, wherein:
the vehicle condition detector includes a tire air pressure detector fitted to a wheel of the vehicle for transmitting the second radio signal for a tire monitoring system.

\* \* \* \* \*